US012601197B2

(12) United States Patent
Simper

(10) Patent No.: US 12,601,197 B2
(45) Date of Patent: Apr. 14, 2026

(54) MANAGEMENT SYSTEM FOR MANAGING THE STORAGE, PARKING, OR DELIVERY OF RECREATIONAL VEHICLES

(71) Applicant: Park It Here, LLC, Henderson, NV (US)

(72) Inventor: Jed Simper, Henderson, NV (US)

(73) Assignee: Park It Here, LLC, Henderson, NV (US)

( * ) Notice: Subject to any disclaimer, the term of this patent is extended or adjusted under 35 U.S.C. 154(b) by 259 days.

(21) Appl. No.: 18/191,057

(22) Filed: Mar. 28, 2023

(65) Prior Publication Data

US 2024/0018796 A1    Jan. 18, 2024

Related U.S. Application Data

(63) Continuation of application No. 17/864,482, filed on Jul. 14, 2022, now Pat. No. 11,639,609.

(51) Int. Cl.
| | |
|---|---|
| *E04H 6/34* | (2006.01) |
| *B60D 1/07* | (2006.01) |
| *E04H 6/40* | (2006.01) |
| *E04H 6/42* | (2006.01) |

(52) U.S. Cl.
CPC ................ *E04H 6/34* (2013.01); *E04H 6/40* (2013.01); *E04H 6/424* (2013.01); *B60D 1/07* (2013.01)

(58) Field of Classification Search
CPC .... B60D 1/07; E04H 6/22; E04H 6/24; E04H 6/28; E04H 6/30; E04H 6/32; E04H 6/34; E04H 6/36; E04H 6/40; E04H 6/42; E04H 6/424; E04H 6/44
See application file for complete search history.

(56) References Cited

U.S. PATENT DOCUMENTS

| | | | | | |
|---|---|---|---|---|---|
| 1,807,597 | A | * | 6/1931 | Lowenstein | ............ E04H 6/302 104/44 |
| 1,816,685 | A | * | 7/1931 | Lowenstein | .............. E04H 6/40 104/48 |
| 5,669,753 | A | * | 9/1997 | Schween | ................. E04H 6/287 414/800 |

(Continued)

FOREIGN PATENT DOCUMENTS

| | | | | |
|---|---|---|---|---|
| DE | 102017220576 | A1 * | 5/2019 | ............... E04H 6/36 |
| WO | WO-2018160819 | A1 * | 9/2018 | ............... B60D 1/07 |

*Primary Examiner* — James Keenan
(74) *Attorney, Agent, or Firm* — Bayramoglu Law Offices LLC

(57)    ABSTRACT

A management system and method are provided for managing the storage, parking, and delivery of a recreational vehicle (RV). The management system may include a block unit for receiving the RV, a delivery system connected to the block unit for transporting the RV to and from the block unit, and a movement system for moving the components of the delivery system. The delivery system may include a delivery housing for transporting the RV to and from the block unit, a first turntable for delivering the RV to or receiving the RV from the delivery housing, and a second turntable that may be a component separate from or attached to the delivery housing. The movement system may include rails connecting the delivery system components and rail sensors positioned near the rails for directing the movement of the delivery system components on the rails. The delivery housing may be adjustable in size.

17 Claims, 29 Drawing Sheets

(56) References Cited

U.S. PATENT DOCUMENTS

| | | | |
|---|---|---|---|
| 7,465,141 B1 * | 12/2008 | Fournier | E04H 6/28 |
| | | | 414/241 |
| 9,181,722 B2 * | 11/2015 | Rathbun | B66F 9/07 |
| 2017/0226764 A1 * | 8/2017 | Nussbaum | E04H 6/24 |
| 2021/0270054 A1 * | 9/2021 | Garcia, III | E04H 6/287 |

* cited by examiner

200

202

208

206

204

339
336
334

131                 131

191

315

315

MANAGEMENT SYSTEM FOR MANAGING THE STORAGE, PARKING, OR DELIVERY OF RECREATIONAL VEHICLES

CROSS-REFERENCE TO RELATED APPLICATIONS

This application is a continuation application of U.S. patent application Ser. No. 17/864,482, filed on Jul. 14, 2022, the entire content of which is incorporated herein by reference.

TECHNICAL FIELD

The present invention relates to a management system for managing the storage, parking, or delivery of recreational vehicles (RV).

BACKGROUND

A recreational vehicle, often abbreviated as RV, is a motor vehicle or trailer, which includes living quarters designed for accommodation. A recreation vehicle trailer means a trailer designed to be drawn by a vehicle with motive power by means of a bumper, frame, or fifth wheel hitch and designed to provide temporary residential accommodations, which include the following facilities: cooking; refrigeration or ice box; self-contained toilet; heating and air conditioning, a potable water supply system including a faucet and a sink; and a separate 110-125-volt electrical power supply and/or propane. A recreation vehicle trailer may include trailers used for personal purposes, commonly known as "sport utility RVs" or "toy haulers," which usually have spacious rather than incidental living quarters and provide a cargo area for smaller items for personal use such as motorcycles, mountain bikes, all-terrain vehicles (ATVs), snowmobiles, canoes or other types of recreational gear. Types of RVs that this invention was designed and/or intended for include Class A, B, and C motorhomes, travel trailers, lightweight trailers, toy haulers, fifth-wheel toy haulers, campervans, coaches, caravans, and fifth-wheel trailers.

A motor home means a multipurpose passenger vehicle with motive power that is designed to provide temporary residential accommodations, which includes at least four of the following facilities: Cooking; refrigeration or ice box; self-contained toilet; heating and/or air conditioning; a potable water supply system including a faucet and a sink; and a separate 110-125-volt electrical power supply and/or propane.

A pull trailer means a trailer, except a pole trailer, that is equipped with two or more axles that support the entire weight of the trailer.) A boat trailer means a trailer designed with cradle-type mountings to transport a boat and configured to permit the launching of the boat from the rear of the trailer. Bus means a motor vehicle with motive power, except a trailer, designed for carrying more than 10 persons. Semitrailer means a trailer, except a pole trailer, so constructed that a substantial part of its weight rests upon or is carried by another motor vehicle. A trailer means a motor vehicle with or without motive power, designed for carrying persons or property and for being drawn by another motor vehicle.

There may be many reasons why a recreational vehicle (RV) may be stored at a facility. A property may not have sufficient space to store or park a recreational vehicle. For example, a residential property may not have enough space in the garage or driveway, or an HOA may not allow a recreational vehicle to be parked at the property. An RV business may desire to provide adequate RV parking for its customers. An RV dealership may need to safely store recreational vehicles that may be purchased by a consumer or provide a unique display of certain recreational vehicles. Orderly parking may be desired at an RV park. Facilities for storing, parking, or delivering recreational vehicles may be enclosed or exposed to the outdoors. Such facilities may be used for short-term or long-term storage or parking of recreational vehicles. In existing facilities, transporting recreational vehicles into, out of, and within the facility may be performed by the person driving the recreational vehicle to the facility (e.g., authorized user, owner) or an employee of the facility. The facility may have a standard space allotted for different types of recreational vehicles that have different dimensions and configurations. A recreational vehicle within the standard space may not be protected from damage.

SUMMARY

The present disclosure overcomes the deficiencies of existing facilities.

An embodiment of the present invention may provide a management system for managing the storage, parking, and delivery of a recreational vehicle in an indoor or outdoor facility. The management system may be completely automated, requiring no or negligible human intervention to store, park, or deliver recreational vehicles. The management system may include a block unit in a fixed position for receiving the recreational vehicle, a delivery system connected to the block unit for transporting the recreational vehicle to and from the block unit, and a movement system for moving the components of the delivery system to transport the recreational vehicle in a delivery housing to and from the block unit. The delivery system may include a delivery housing for receiving the recreational vehicle and transporting the recreational vehicle to and from the block unit and turntable(s). The turntable(s) are components of the delivery system that position and move the recreational vehicle in the desired direction to and from the block unit. A first turntable is configured to connect with the delivery housing for delivering the recreational vehicle to the delivery housing or receiving the recreational vehicle from the delivery housing. The movement system may include a plurality of rails connecting the block unit, the delivery housing, and the first turntable, and a plurality of rail sensors positioned near the rails for directing movement of the delivery housing with or without the recreational vehicle on the plurality of rails. The delivery housing may include a main frame and adjustable portions connected to the main frame. The delivery housing may have adjustable dimensions that can be adjusted by the adjustable portions relative to the main frame to accommodate the recreational vehicle based on the length and width of the unit. The adjustable portions may have extensions to increase or decrease the adjustable dimension. In some cases, the delivery system may include a second turntable positioned on the plurality of rails as a separate component from the delivery housing. In some cases, the second turntable may be attached to the underside of the delivery housing.

In some cases, the delivery housing may include a sensor for guiding the movement of the delivery housing on the rails. In some cases, the adjustable dimension of the delivery housing may be an adjustable length to accommodate the recreational vehicle based on length, and the adjustable portion may have a length extension to increase or decrease the adjustable length. In some cases, the adjustable dimensions of the delivery housing may be an adjustable width to accommodate the recreational vehicle based on width, and the adjustable portion may be a width extension to increase or decrease the adjustable width. In some cases, the adjustable dimension of the delivery housing may be an adjustable height to accommodate the height of travel trailers and fifth wheels hitch height, and the adjustable portion may be a height extension to increase or decrease the adjustable height. In some cases, a recreational vehicle sensor may be positioned near the first turntable for sensing recreational vehicle size and type and triggering the extension when activated by the presence of the recreational vehicle. In some cases, the recreational vehicle sensor may be positioned on a surface shared by the first turntable. In some cases, a recreational vehicle sensor may be positioned near the first turntable for sensing recreational vehicle size and type and triggering the extension when activated by the presence of the recreational vehicle. In some cases, the recreational vehicle sensor may be positioned on a different surface from the first turntable. In some cases, the delivery housing may have a plurality of adjustable portions and the delivery housing may have a plurality of adjustable dimensions that can be adjusted by the plurality of adjustable portions relative to the main frame. In some cases, a first adjustable dimension of the plurality of adjustable dimensions may be an adjustable length to accommodate the recreational vehicle based on length, a first adjustable portion of the plurality of adjustable portions may be a length extension to increase or decrease the adjustable length, a second adjustable dimension of the plurality of adjustable dimensions may be an adjustable width to accommodate the recreational vehicle based on width, and a second adjustable portion of the plurality of adjustable portions may be a width extension to increase or decrease the adjustable width.

An embodiment of the present invention may provide a method of operating a management system for managing the storage, parking, and delivery of a recreational vehicle. The management system may be completely automated, requiring no or negligible human intervention to store, park, or deliver recreational vehicles. The management system may include a block unit in a fixed position for receiving the recreational vehicle, a delivery system connected to the block unit for transporting the recreational vehicle to and from the block unit, and a movement system for moving the components of the delivery system to transport the delivery housing with or without the recreational vehicle to and from the block unit. The delivery system may include a delivery housing for receiving the recreational vehicle and transporting the recreational vehicle to and from the block unit and turntable(s). The turntable(s) are components of the delivery system that position and move the recreational vehicle in the desired direction to and from the block unit. A first turntable is configured to connect with the delivery housing for delivering the recreational vehicle to the delivery housing or receiving the recreational vehicle from the delivery housing. The movement system may include a plurality of rails connecting the block unit, the delivery housing, and the first turntable, and a plurality of rail sensors positioned near the rails for directing the movement of the recreational vehicle in a delivery housing on the plurality of rails. The delivery housing may include a main frame and an adjustable portion connected to the main frame. The delivery housing may have an adjustable dimension that can be adjusted by the adjustable portion relative to the main frame to accommodate the recreational vehicle based on size. The adjustable portion may have an extension to increase or decrease the adjustable dimension. The delivery housing may move on the plurality of rails of the movement system.

In some cases, the delivery housing may contain the recreational vehicle, and the method may include moving the delivery housing containing the recreational vehicle on the plurality of rails of the movement system. In some cases, the block unit may be positioned along an edge of a cliff. In some cases, the method may include aligning the delivery housing with the first turntable when the recreational vehicle is positioned on the first turntable. In some cases, the delivery housing may be aligned by moving on the plurality of rails into a position that is colinear with the first turntable. In some cases, the method may include receiving the recreational vehicle on or by the first turntable, moving the first turntable into the delivery housing, and positioning and releasing the recreational vehicle from the first turntable into the delivery housing. In some cases, the first turntable may be moved into the delivery housing by moving the plurality of rails. In some cases, the method may include receiving the recreational vehicle by the delivery housing, moving the second turntable to position the delivery housing, and moving the delivery housing into the block unit. In some cases, the second turntable and the delivery housing may be moved on the plurality of rails. In some cases, the method may include sensing a dimension of the recreational vehicle by a recreational vehicle sensor. In some cases, the recreational vehicle sensor may trigger the extensions of the adjustable portions to increase or decrease the adjustable dimensions. In some cases, the block unit may have a release sensor. In some cases, the method may include the delivery housing containing the recreational vehicle entering the block unit and contacting the release sensor to trigger the release of the recreational vehicle from the delivery housing into the block unit. In some cases, the method may involve latching the recreational vehicle within the block unit. In some cases, the method may involve securing the recreational vehicle on the first turntable.

DETAILED DESCRIPTION

A facility for storing, parking, and delivering recreational vehicles may require a person to transport a recreational vehicle to and from a space in the facility. The facility may be an indoor or outdoor facility. The facility may be a commercial or residential facility. The chances of damaging the recreational vehicle, other recreation vehicles on the delivery path, or the facility may be higher when a person is transporting the recreational vehicle. The time it takes for a person to transport a recreational vehicle may be higher than an automated transport system. Once inside the space, the recreational vehicle may not be protected from damage. These spaces also may not precisely accommodate the size and the configuration of the recreational vehicle, and this may cause a waste of space.

An embodiment of the present invention may provide a management system for storing, parking, or delivery recreational vehicles, such as recreational vehicles. The management system may be completely automated, requiring no or negligible human intervention to store, park, or deliver recreational vehicles. The management system may provide a delivery system, a movement system, and a block unit. The delivery system may transport a recreational vehicle to and from the block unit in a delivery housing via the movement system. The movement system may provide a defined path for the delivery system. The defined path may provide efficient delivery of recreational vehicles while minimizing the risk of damage to recreational vehicles during transport. The block unit may be in a fixed position and may have a securing mechanism so the recreational vehicle may be secured within the block unit. A fixed block unit may be beneficial for storing or parking recreational vehicles in precarious situations, such as along an edge of a cliff. The block unit may be sized for receiving certain recreational vehicles. Optimizing the size of the block unit to the size of the recreational vehicle may minimize space usage in the facility. The delivery housing may be sized and configured for receiving certain recreational vehicles. An appropriately sized and configured delivery housing may ensure safe delivery of the recreational vehicle, such as minimizing movement of the recreational vehicle inside the delivery housing that may cause the recreational vehicle to bump into the sidewalls or other components inside the delivery housing during the delivery of the recreational vehicle or fall out of the delivery housing.

Figure 1:
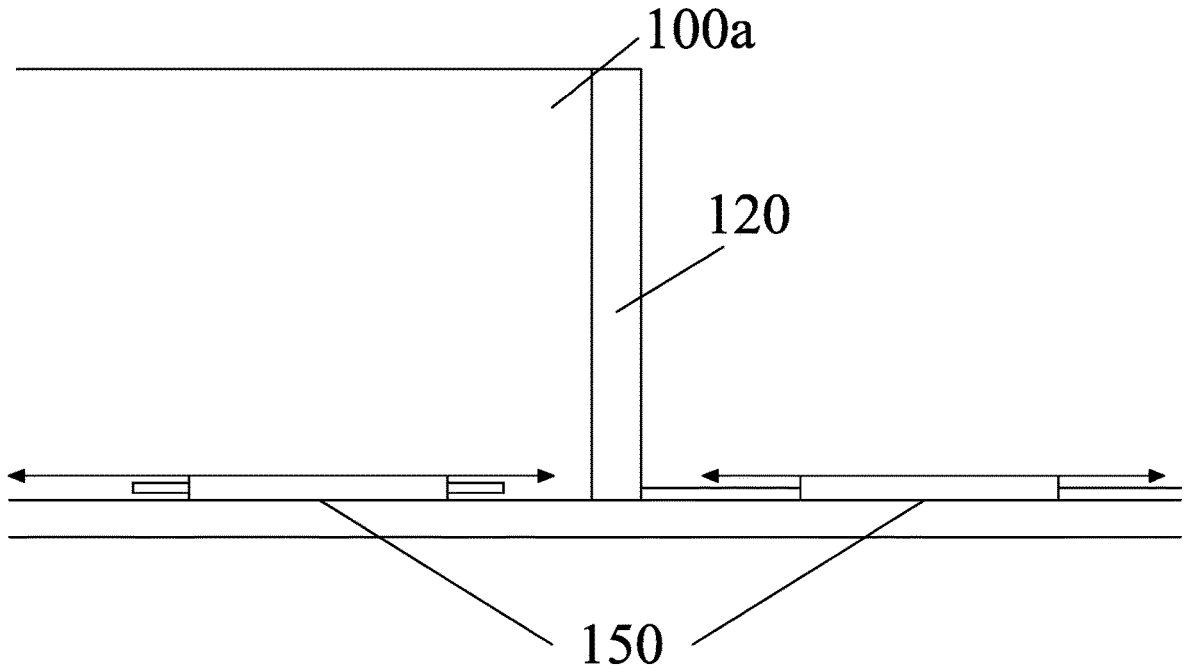
FIG. 1 shows a cross-sectional view of a facility for storing or parking recreational vehicles.

FIG. 1 shows a cross-sectional view of a facility for storing or parking recreational vehicles. The facility 100*a* may be an RV dealership, RV park, RV storage facility, or any other RV type of business, or private owner of RV. The facility may be open or closed to the environment or a combination (e.g., a first portion of the facility may be open and a second portion of the facility may be closed). When a recreational vehicle is positioned on an exterior turntable 110, the exterior turntable 110 and the recreational vehicle on top of the exterior turntable 110 may move into the facility 100*a* through an entrance 120 (e.g., opening, door, archway). A delivery housing 130 may be situated inside the facility to receive the exterior turntable 110 with the recreational vehicle. The delivery housing 130 may be aligned (e.g., collinear) with the exterior turntable 110 to directly receive the exterior turntable 110 with the recreational vehicle. The exterior turntable 110 may move into the facility 100*a* by translational motion, such as sliding horizontally into the facility relative to the ground. The movement of the exterior turntable 110 may be activated by an authorized person (e.g., driver, recreational vehicle owner, facility owner) by phone or controls near the entrance to the facility. It may be desirable for the driver of the recreational vehicle to exit the recreational vehicle and/or unhook the recreation vehicle from the tow recreational vehicle before activating the movement of the exterior turntable 110. The delivery housing 130 can be moved in any linear or rotational direction, such as forward, backward, and sideways. The delivery housing 130 may be moved by an interior turntable. The exterior turntable 110, delivery housing 130, and interior turntable 190 may form a delivery system 150.

Figure 2:
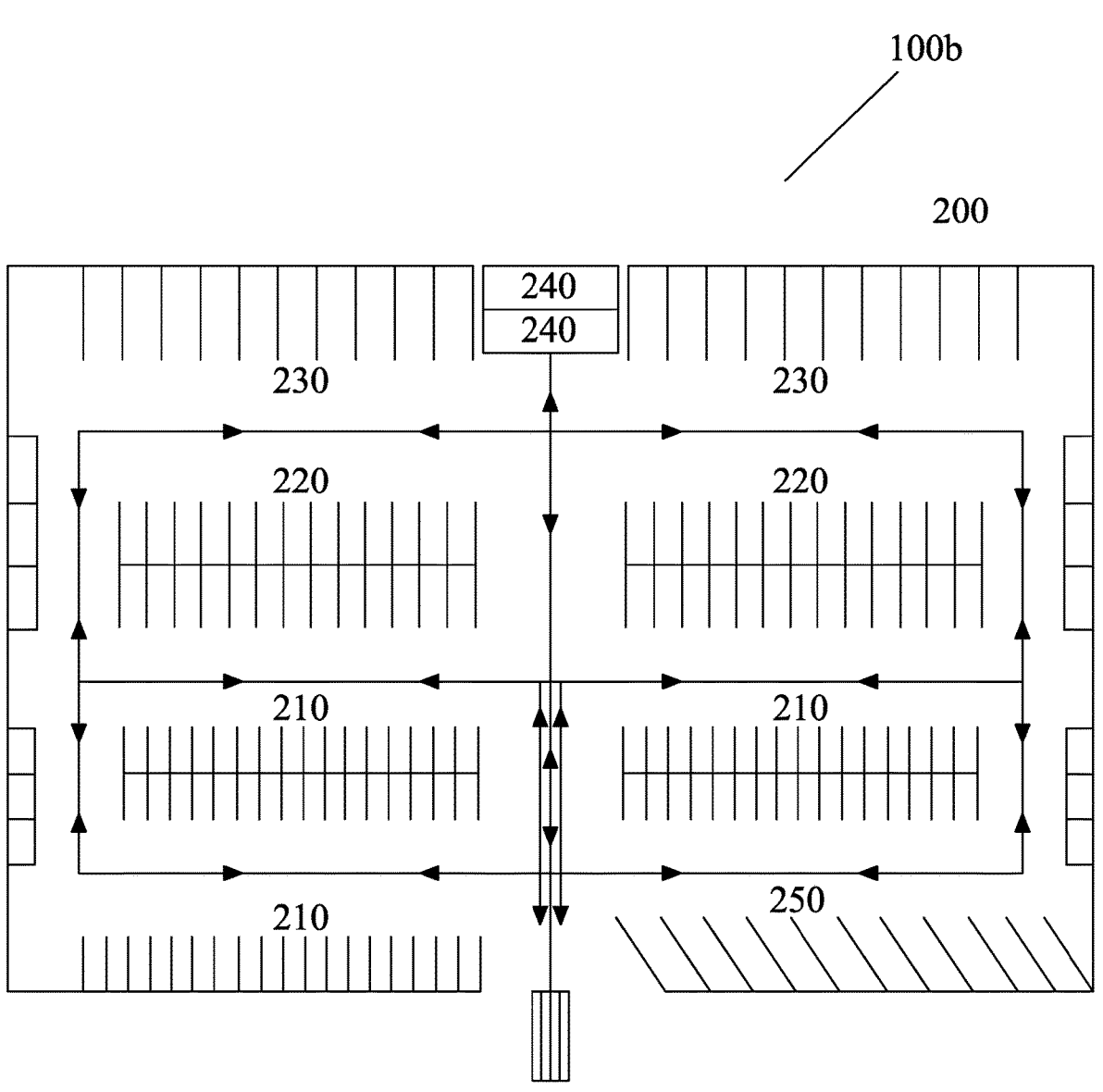
FIG. 2 shows an example layout of a facility for storing or parking recreational vehicles.

FIG. 2 shows an example layout of a facility for storing or parking recreational vehicles. The facility 100*b* has block units 200, each of which may be occupied by a recreational vehicle. Block units may be identified as small block units (SBUs) 210, medium block units (MBUs) 220, large block units (LBUs) 230, and extra-large block units (ELBUs) 240 based on the dimensions of block units that are sized for receiving recreational vehicles of different dimensions. SBUs may be 25'×12' with a tolerance of +/−5' for each dimension. MBUs may be 35'×15' with a tolerance of +/−5' for each dimension. LBUs may be 50'×20' with a tolerance of +/−5' for each dimension. ELBUs may be 75'×25' with a tolerance of +/−5' for each dimension. The facility 100(*b*) may be any square footage of any assortment, arrangement, and number of block units. For example, a 250,000 square feet facility may have two groups of LBUS, a group of ELBUs, two groups of MBUs, three groups of SBUs, and optional parking 250 have an assortment of block units. Each group of the same type of block unit may or may not have the same number of block units. The 250,000 square feet facility may contain 20 individual LBUs, 2 individual ELBUs, 58 individual MBUs, 88 SBUs, and optional parking 250 that may have 5 SBUs, 5 MBUs, and 3 LBUs.

Figure 3:
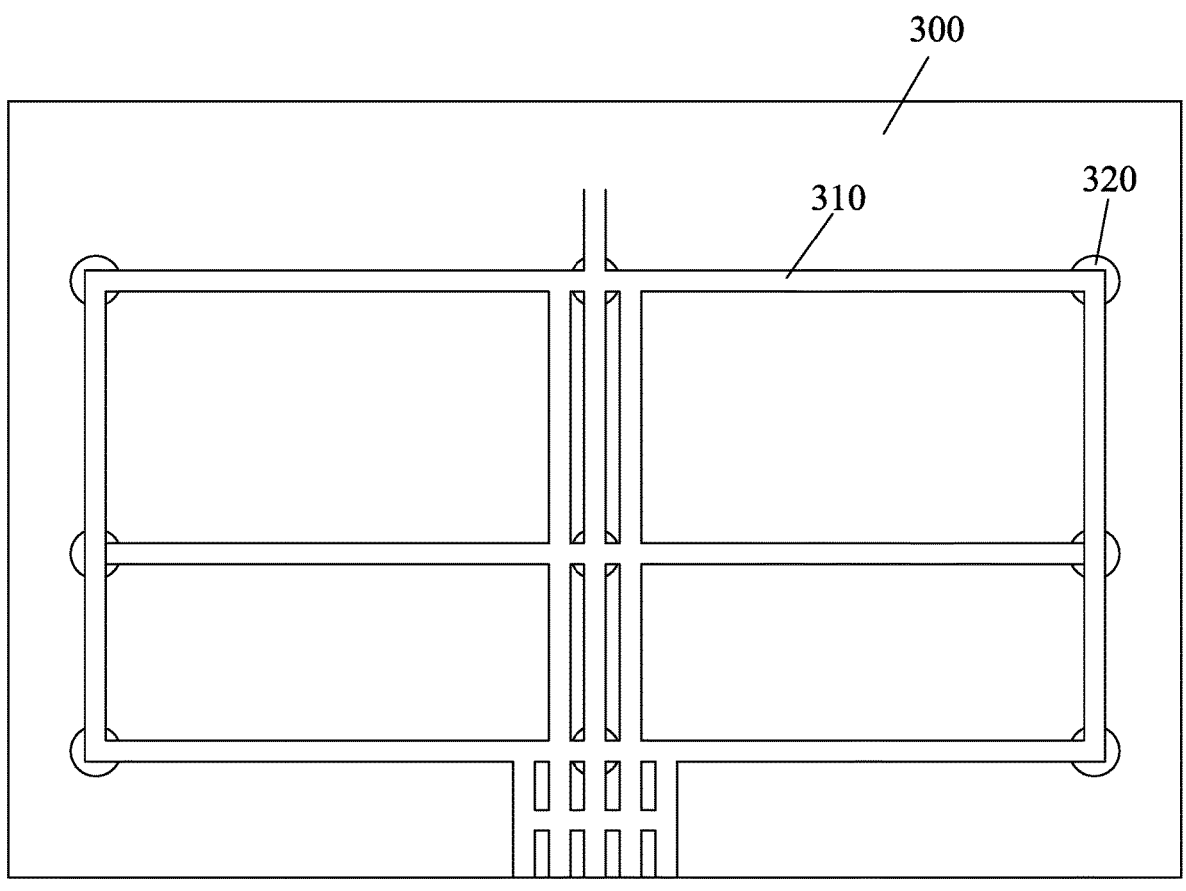
FIG. 3 shows an example movement system for moving components of the delivery system inside and outside a facility as shown in FIG. 2.

FIG. 3 shows an example movement system for moving components of the delivery system inside and outside a facility as shown in FIG. 2. The movement system 300 may be configured in a track form with interconnected rails 310 and rail sensors 320 disposed near or on the rails. The sensors 320 may be disposed at the intersection of rails. The delivery system 150, which may include components such as the first turntable (e.g., exterior turntable) 110, delivery housing 130, and second turntable (e.g., interior turntable) 190 may be positioned on the movement system 300. The components 110, 130, 190 of the delivery system 150 may be moved on the rails 310 to reach a destination. The example movement system may be suitable for any facility size or layout, such as the 250,000 square feet facility as shown in FIG. 2.

Figure 4A:
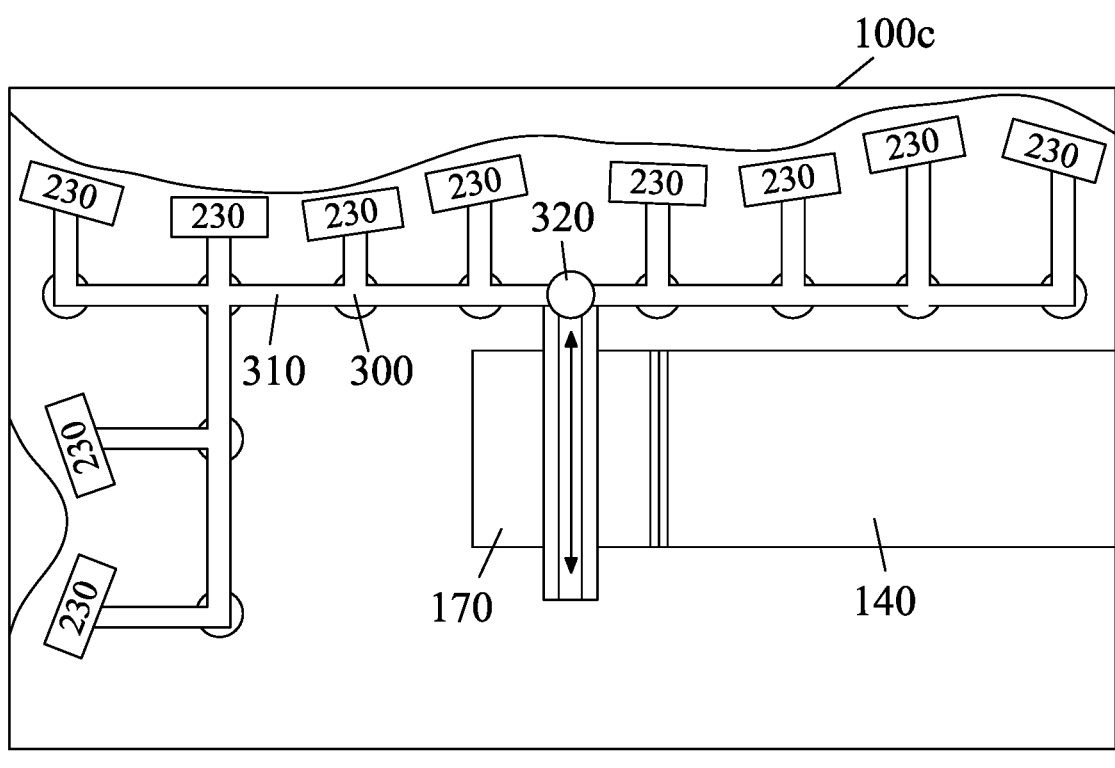
FIG. 4A shows an example layout of an RV park facility.

FIG. 4A shows an example layout of an RV park facility. The facility 100*c* may be an RV park that is built on an edge of a cliff. Persons staying in an RV parked in an RV park along an edge of a cliff may enjoy the beautiful scenery. The present invention may allow RV parks to be built along an edge of a cliff. The controlled positioning of RVs into fixed position block units along an edge of a cliff may reduce the risk that RVs may fall off the edge of the cliff. A recreational vehicle may enter and exit the RV park through a driveway 140. The driver of the RV may position the RV on an exterior turntable so the RV can be moved along the movement system 300 that is in a track form with interconnected rails 310 to an unoccupied block unit (e.g., LBU) with the aid of rail sensors 320. The movement system 300 may allow the components of the delivery system 150 to position or move in any direction. The block unit may be pre-assigned during the reservation process or assigned upon arrival at the RV park. Personnel or a self-serve kiosk at the registration office 170 may assign a block unit for the RV. A computer for receiving information from the personnel or a self-serve kiosk may be integrated with the movement system. The computer may trigger the delivery of a delivery housing to receive an RV from the first turntable and move the delivery housing containing the RV to the assigned block unit.

Figure 4B:
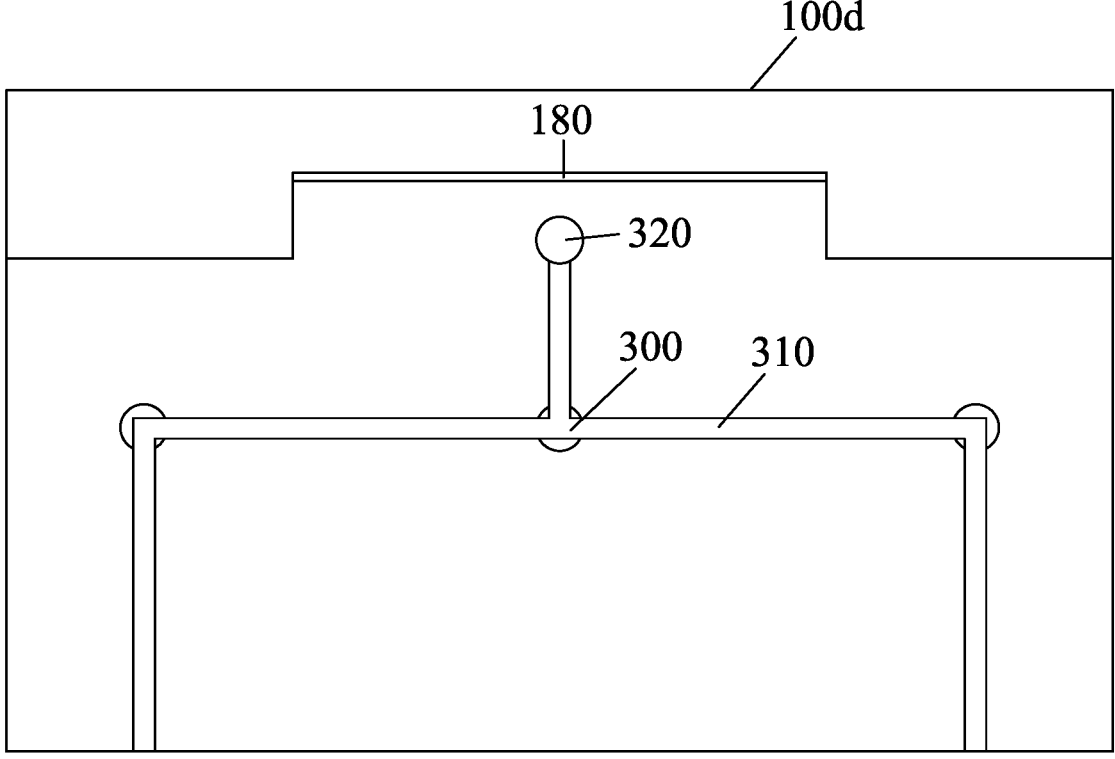
FIG. 4B shows an example layout of an RV dealership.

FIG. 4B shows an example layout of an RV dealership. The facility 100*d* has a movement system 300 that is in a track form with rails 310 and sensors 320 disposed on or near the rails for providing the management system with the capability of delivering an RV from storage through an exit door 180 for purchase or test drive or receiving an RV for storage (e.g., from the manufacturer, declined purchase, exhibition, or display purposes).

Figure 5:
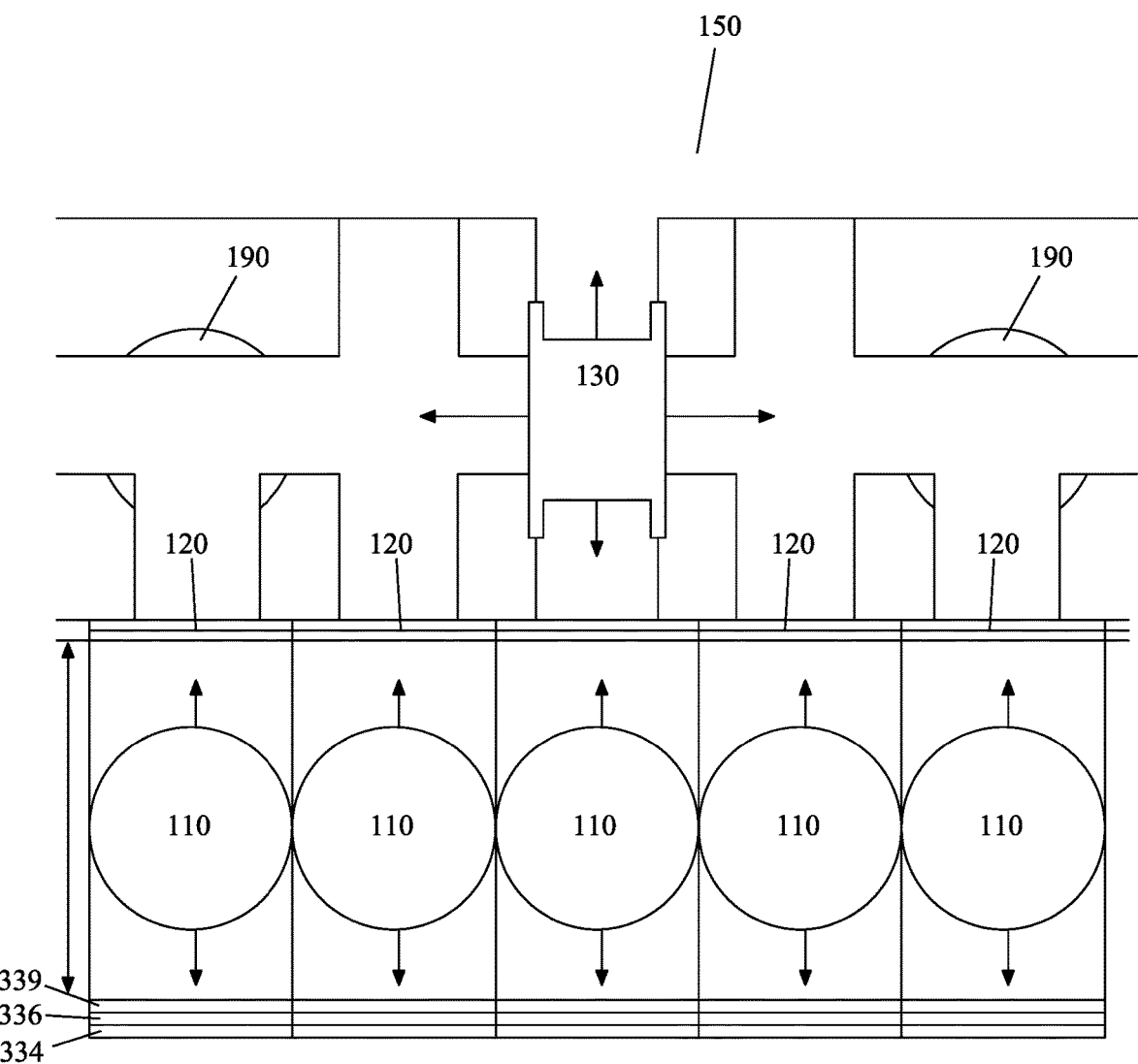
FIG. 5 shows an example configuration of an example delivery system for storing, parking, or delivering RVs.

FIG. 5 shows an example configuration of an example delivery system for storing, parking, or delivering RVs. The delivery system 150 may include a first turntable (e.g., exterior turntable) 110, delivery housing 130, and a second turntable (e.g., interior turntable) 190. The delivery system 150 may be moved by the movement system 300. When an RV is positioned onto the exterior turntable 110, the RV may trigger the recreational vehicle sensors 334, 336, 339. The recreational vehicle sensors 334, 336, 339 may be triggered by the presence of a recreational vehicle. In some examples, a recreational vehicle sensor may be positioned on the same surface as the first turntable 110. In some examples, a recreational vehicle sensor may be positioned on a different surface from the first turntable 110. In some examples, a recreational vehicle sensor (e.g., floor sensor, side sensor) may be on the ground or on the same surface of the first turntable and triggered by contact with the recreational vehicle driving over the sensors. In some examples, a recreational vehicle sensor may be positioned on a side of the entrance to the facility and triggered by contact from the sides of the recreational vehicle with the entrance of the facility. In some examples, a recreational vehicle sensor may be a recreational vehicle detecting sensor that detects the presence of a recreational vehicle without contact between the recreational vehicle and the recreational vehicle sensor.

Triggering the recreational vehicle sensors 334, 336, 339 may cause the delivery housing 130 of proper size and type to be aligned with the first turntable (e.g., exterior turntable) 110 corresponding to the triggered recreational vehicle sensors 334, 336, 339. In some examples, the first turntable (e.g., exterior turntable) 110 and corresponding recreational vehicle sensors 334, 336, 339 may correspond with a certain size or type of RV and labeled as such so drivers may position only the certain size or type of RV onto the specifically labeled first turntable. In some examples, the delivery housing 130 may adjust in size based on data from sensors 334, 336, 339 about the size of the RV. The delivery housing 130 may be moved by interior turntable 190 on the movement system 300.

When the RV is positioned on the first turntable, the driver of the RV may get out of the RV, unhook the trailer from a tow recreational vehicle, and activate the management system by phone or controls in the facility (e.g., near the entrance of the facility). Activating the management system may cause the exterior turntable to slide horizontally along the ground and into the delivery housing. When the recreational vehicle is delivered into the delivery housing, the delivery housing may move in any direction on the second turntable (e.g., interior turntable) toward the block unit.

Figure 6A:
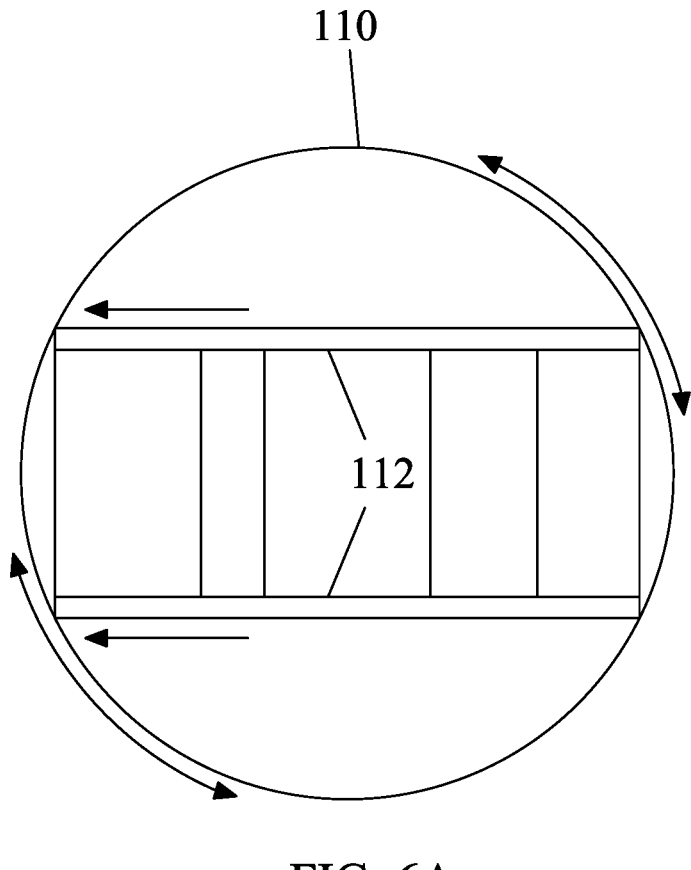
FIG. 6A shows a top view of an example exterior turntable.

FIG. 6A shows a top view of an example exterior turntable. The exterior turntables 110 may be positioned at the start of the delivery system and/or near the entrances/exits to the facilities. Even if the facility is outside (e.g., an RV park), these turntables may be considered "exterior in the delivery system" because they tend to be positioned outside the facility, further away from the block unit than the interior turntable, and operates to move a recreational vehicle to and from the delivery housing. The top section of the exterior turntables can rotate to any angle from 0 degrees to 360 degrees in either direction to allow for easy positioning of the RVs and/or trailers as they go in and out of the delivery system and/or facilities. The exterior turntable 110 may be sufficiently sized area to accommodate any sized RV or an RV that corresponds with the exterior turntable. The exterior turntable 110 may have brackets and/or frames 112 that can extend out and/or decrease in size to provide support to the outside wheels of the RVs and/or trailers as the exterior turntables slide horizontally toward the delivery housing. If a trailer is the recreational vehicle being stored, parked, and/or delivered, the turntable can be rotated 180 degrees to allow the tow recreational vehicle to unhook from the trailer before the brackets and/or frames 112 secure the trailer. Once the tow recreational vehicle is off the exterior turntable 110, the exterior turntable 110 may rotate 180 degrees again toward the delivery housing 130.

Figure 6B:
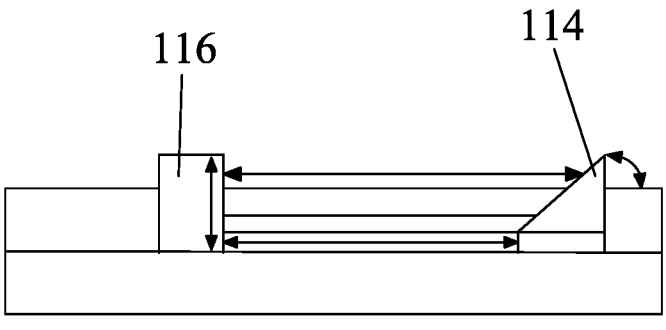
FIG. 6B shows an example configuration of a mechanism for securing an RV on the exterior turn table.

FIG. 6B shows an example configuration of a mechanism for securing an RV on the exterior turntable. When an RV and/or trailer is positioned onto the exterior turntable, a push plate 114 with a pressure sensor or switch may extend up behind the back wheels of the RV and/or trailer. If a trailer is the recreational vehicle that may be stored, parked, and/or delivered, the trailer push and/or roll pad 116 may also extend up under the front of the trailer and trailer coupler. The push pad plate 114 and/or trailer push and/or roll pad 116 may stabilize the recreational vehicle as the exterior turntable delivers the RV and/or trailer to the delivery housing 130. The trailer push and/or roll pad 116 may rest on the front of the trailer and trailer coupler.

This pad can be made of any material soft enough not to damage the RVs and/or trailers but strong enough to support the weight of even the heaviest type trailers like large 3-axle $5^{th}$ wheels and/or toy haulers. The trailer push and/or roll pad 116 may run the width of brackets and/or frames 112 to accommodate any sized trailer and/or trailer coupler widths and can preferably adjust to a height of 3' from the top of exterior turntable body with a possible height adjustment of +/−1' from the 3' preference. If an RV is the recreational vehicle that may be stored, parked, and/or delivered, the trailer push and/or roll pad 116 remains closed so the front RV tires may be prevented from moving forward.

Figure 7A:
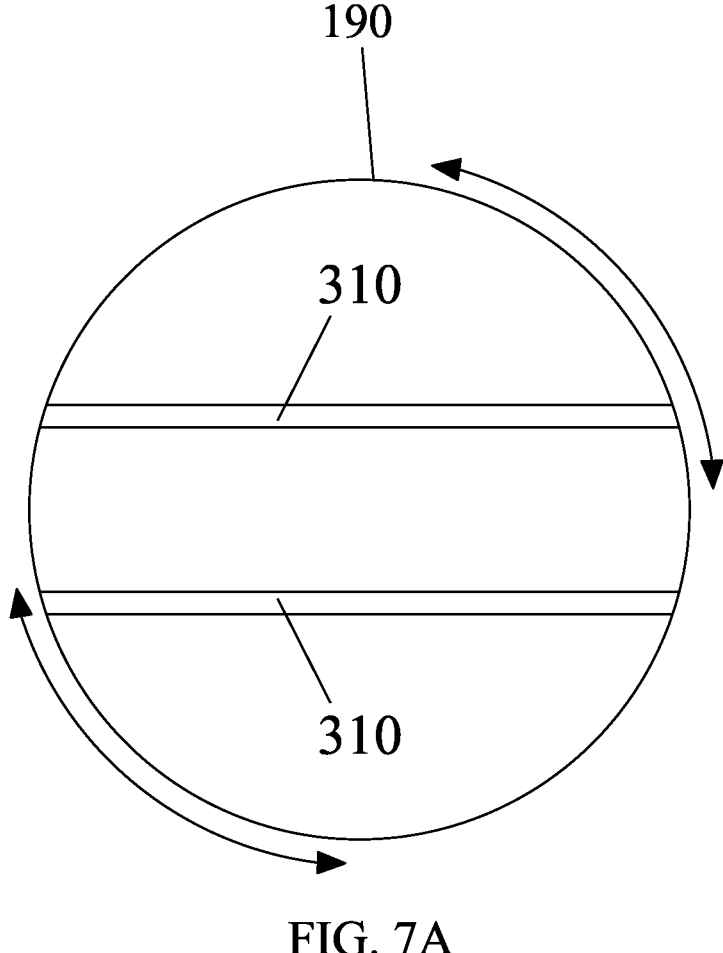
FIG. 7A shows a top view of an example interior turntable.
Figure 7B:
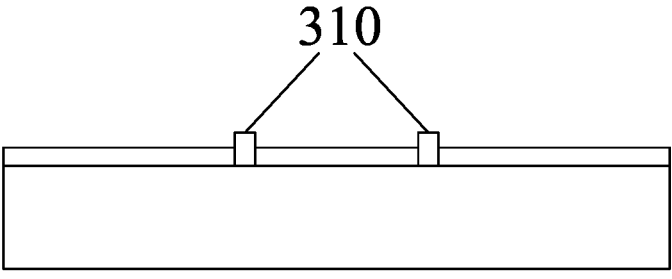
FIG. 7B shows a side view of an example interior table.

FIG. 7A shows a top view of an example interior turntable. FIG. 7B shows a side view of an example interior table. The interior turntable 190 may be positioned along the movement system 300 of rails 310 and/or rail sensors 320 of the delivery system 150. Even if the facility is outside (e.g., an RV park), these turntables may be considered "interior in the delivery system" because they tend to be inside the facility, closer to the block units than the exterior turntables, and operates to move the delivery housing to and from the block units. The top section of the interior turntables can rotate to any angle from 0 degrees to 360 degrees in either direction to allow for easy positioning of the RVs and/or trailers as the RV makes its way through the facility to the Block Unit. The interior turntable(s) 190 may operate on the same size and width of track, rails 310, and/or rail sensors 320 as the rest of the delivery system to allow the delivery housings to seamlessly transition from the interior turntable to rails outside the interior turntable.

Figure 8A:
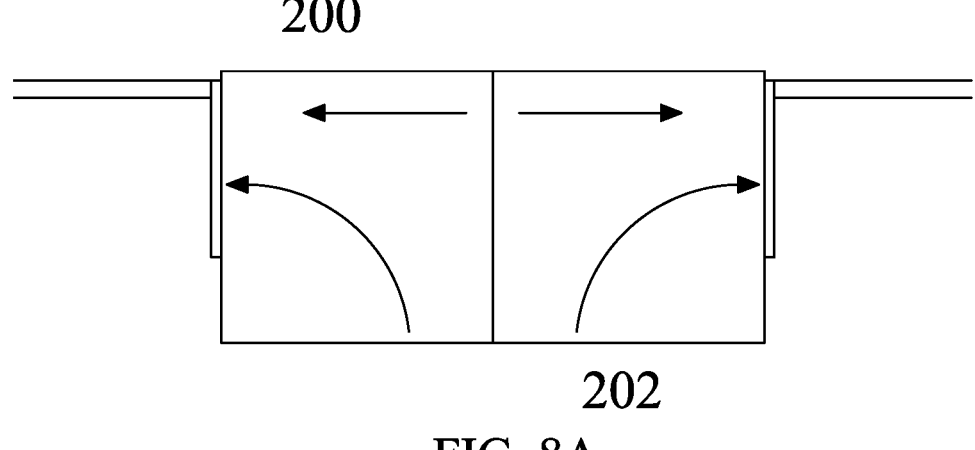
FIG. 8A shows a cross-sectional view of two adjoining block units.
Figure 8B:
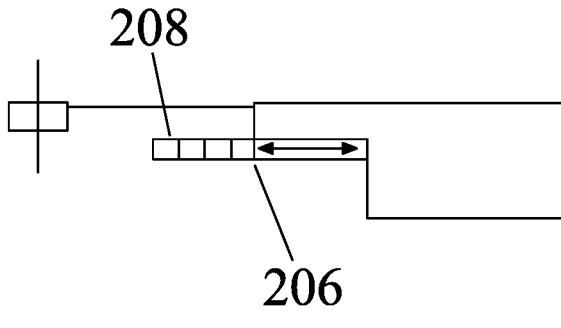
FIG. 8B shows a block unit with a latching plate and a latching clip.
Figure 8C:
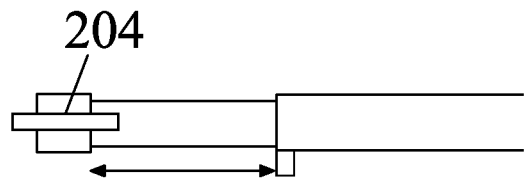
FIG. 8C shows a wheel support frame of a delivery housing.

FIG. 8A shows a cross-sectional view of two adjoining block units. FIG. 8B shows a block unit with a latching plate and a latching clip. FIG. 8C shows a wheel support frame of a delivery housing. When the delivery housing 130 containing an RV delivers the RV into a block unit, the delivery housing 130 may trigger the release sensors 202 in the block unit, for example, by contacting the release sensors or the release sensors has the capability of detecting the delivery housing near the block unit. The release sensors 202 may be positioned anywhere inside the block unit (e.g., back wall). When the release sensors 202 are triggered, the wheel support frame 204 on the delivery housing 130 may retract back into the main frame of the delivery housing. The latching clip or gate 206 may release down which allows the latching plates 208 to release forward and/or expand under the RVs and/or trailer's wheels. The wheel support frame may retract at the same time as the latching clip of the gate is released.

As shown in FIG. 8B, the latching clip and/or gate 206 may be in the up position and the latching plate 208 in a retracted position. When the storage-delivery-parking housing touches the block unit sensor 202, the latching clip and/or gate 206 may release down, allowing the latching plate 208 to release forward and/or expand under the RVs and/or trailer's wheels.

As shown in FIG. 8C, when the storage-parking-delivery housing touches the block sensor 202, the wheel support extensions 204 may retract back into the storage-parking-delivery housing main frame at the same time the latching plate 208 expands under the RVs and/or trailers wheels.

Figure 9A:
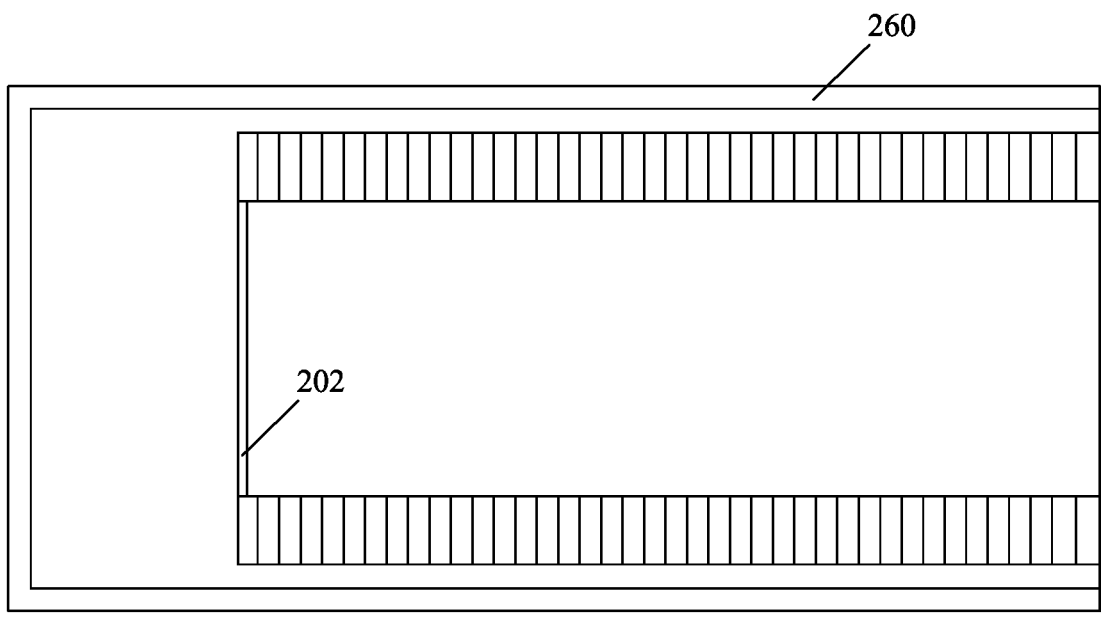
FIG. 9A shows a top view of an example layout of a block unit.
Figure 9B:
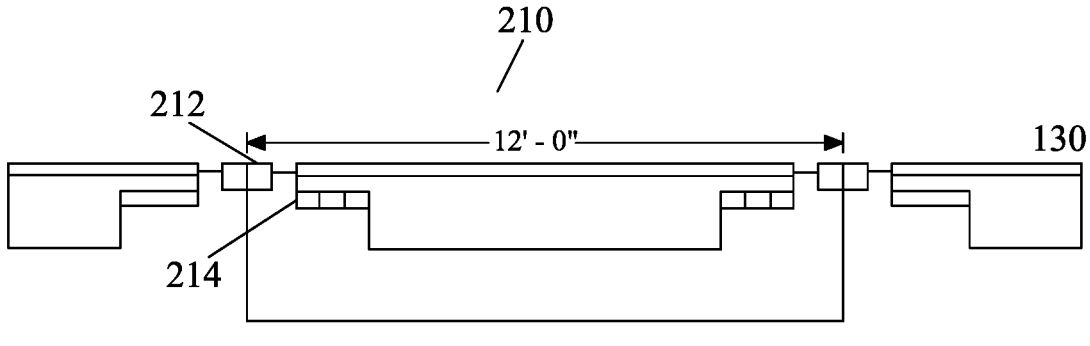
FIG. 9B shows a side view of an example layout of a small block unit (SBU).
Figure 9C:
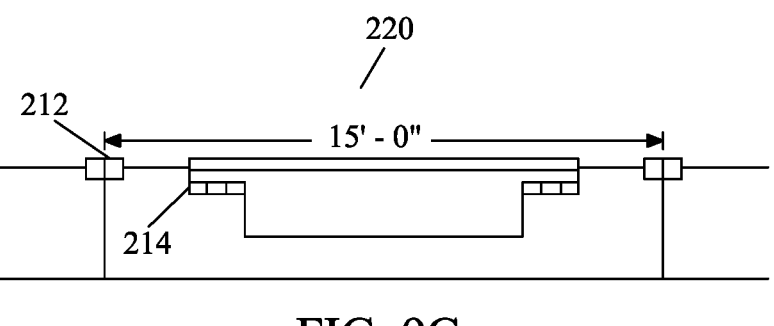
FIG. 9C shows a side view of an example layout of a medium block unit (MBU).
Figure 9D:
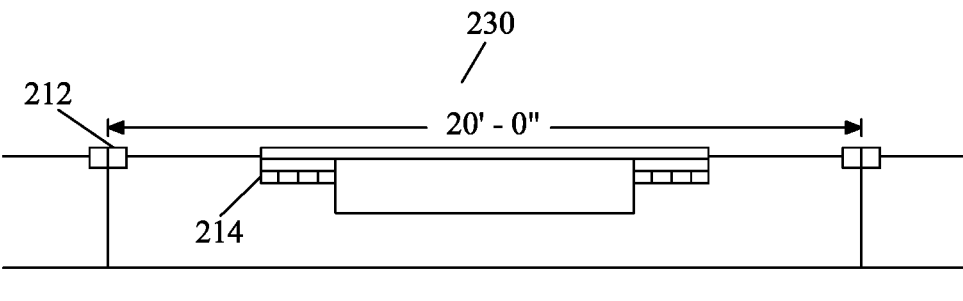
FIG. 9D shows a side view of an example layout of a large block unit (LBU).
Figure 9E:
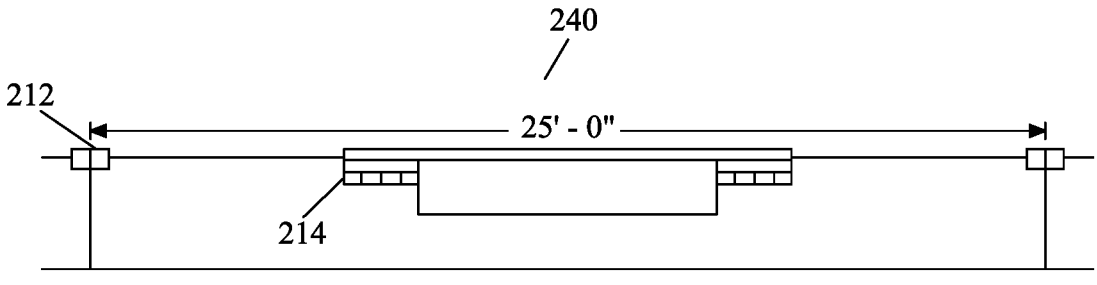
FIG. 9E shows a side view of an example layout of an extra-large block unit (ELBU).

FIG. 9A shows a top view of an example layout of a block unit. FIG. 9B shows a side view of an example layout of a small block unit (SBU). FIG. 9C shows a side view of an example layout of a medium block unit (MBU). FIG. 9D shows a side view of an example layout of a large block unit (LBU). FIG. 9E shows a side view of an example layout of an extra-large block unit (ELBU). Block units may be the final and/or end locations in the storage-parking-delivery system where RVs and/or trailers may be stored-parked-delivered. Block units may be made from concrete, metal, and/or any other solid type of material and have an opening through which the delivery housing 130 may enter and exit the block unit.

"Block Units" may be identified by four different sizes based on the size and type of RV and/or trailers to be stored-parked-delivered. The four sizes may be small, medium, large, and extra-large block units. Small Block Unit (SBUs) storage-parking-delivery spots may be 25'×12', but the dimensions could range an additional +/−5' for each of the measurements listed. Medium Block Units (MBUs) storage-parking-delivery spots may be 35'×15', but the dimensions could range an additional +/−5' for each of the measurements listed. Large Block Units (LBUs) storage-parking-delivery spots may be 50'×20', but the dimensions could range an additional +/−5' for each of the measurements listed. Extra Large Block Units (ELBUs) storage-parking-delivery spots may be 75'×25', but the dimensions could range an additional +/−5' for each of the measurements listed.

As shown in FIGS. 9A-9E, the electric and communication sleeves 212 may be designated spaces for the electrical power for the Block Unit and the individual RVs and/or trailers that may occupy the block unit and the communications cables and/or components for the storage-parking-delivery systems 150 that allow communication and/or transmission of signals between the different components. Latching plates 214 may be positioned along the length of the space of the Block Units. When the storage-parking-delivery housing completes the final delivery of the RV and/or trailer, the delivery housing may touch a sensor 202 at the back of the Block Unit space that sends signals to the latching plates 214 to expand under the tires of the RV and/or trailer. When the sensor 202 is pressed, a signal may be sent to the wheel supports on the storage-parking-delivery housing to collapse and close back up into the storage-parking-delivery housing to allow the tires to rest on the latching plates 214 so the RV and/or trailer stay stored-parked-delivered until it is requested by the RV and/or trailer owners.

Figure 10A:
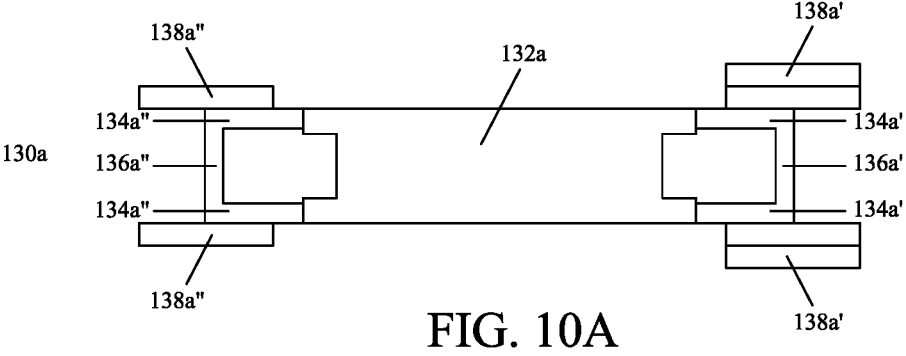
FIG. 10A shows a top view of a housing for Class B type motorhomes and small Class C motorhomes under 25'.
Figure 10B:
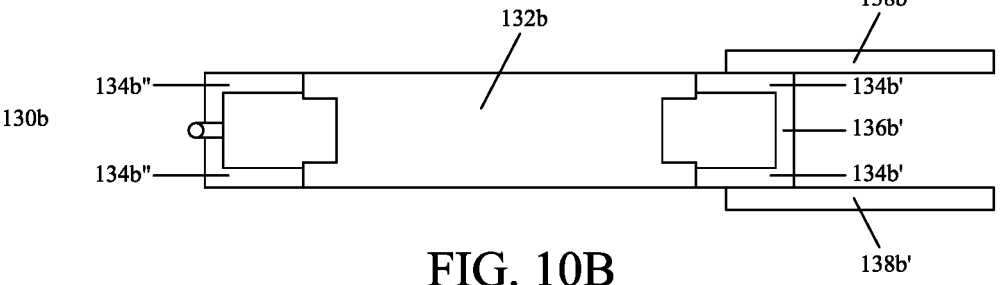
FIG. 10B shows a top view of a housing for smaller sized travel trailers and boat trailers under 25'.
Figure 10C:
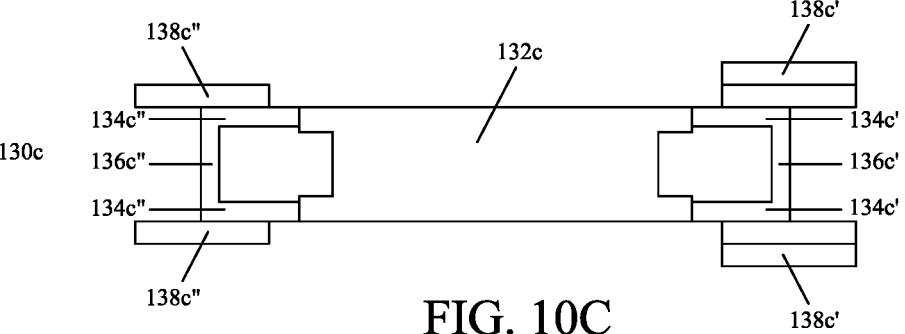
FIG. 10C shows a top view of a housing for most Class C type motorhomes and small Class A type motorhomes up to 35'.
Figure 10D:
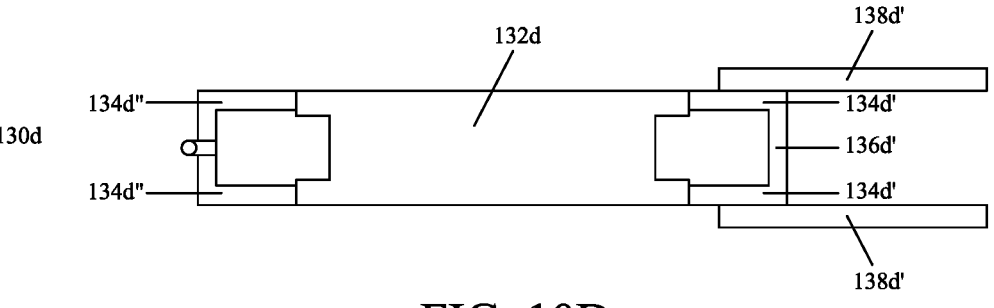
FIG. 10D shows a top view of a housing for medium-large sized travel trailers and boat trailers and small toy haulers up to 35'.
Figure 10E:
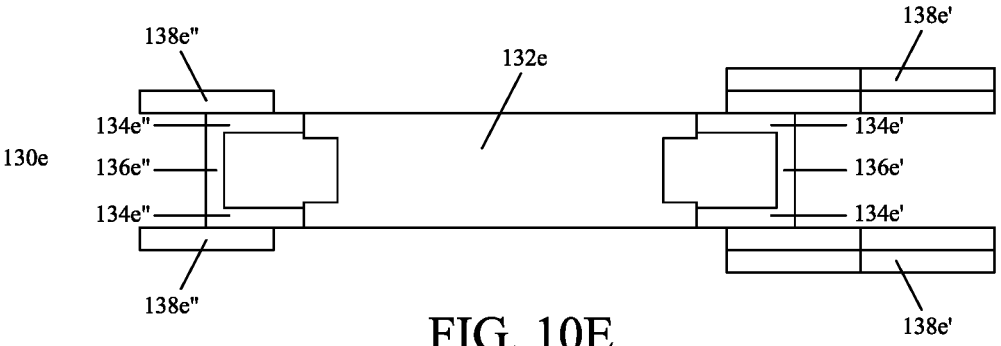
FIG. 10E shows a top view of a housing for most Class A motorhomes and super Class C motorhomes up to 45'.
Figure 10F:
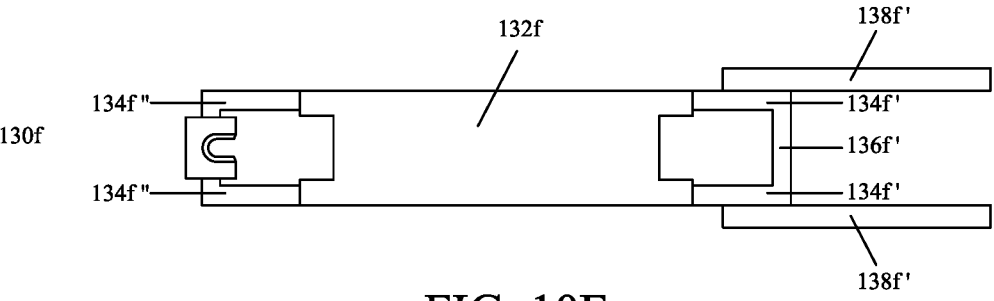
FIG. 10F shows a top view of a housing for larger sized 5$^{th}$ wheels, boat trailers, and large toy haulers.
Figure 10G:
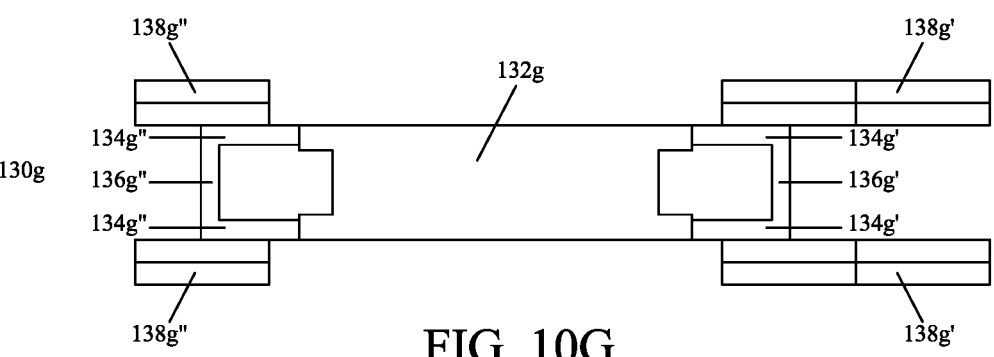
FIG. 10G shows a top view of a housing for most Class A and Class C motorhomes Charter type buses, tour buses, and semi-trucks.

FIGS. 10A-10G show top views of different housings that may be arranged in the block units. FIG. 10A shows a top view of a housing for Class B type motorhomes and small Class C motorhomes under 25'. FIG. 10B shows a top view of a housing for smaller sized travel trailers and boat trailers under 25'. FIG. 10C shows a top view of a housing for most Class C type motorhomes and small Class A type motorhomes up to 35'. FIG. 10D shows a top view of a housing for medium-large sized travel trailers and boat trailers and small toy haulers up to 35'. FIG. 10E shows a top view of a housing for most Class A motorhomes and super Class C motorhomes up to 45'. FIG. 10F shows a top view of a housing for larger sized 5$^{th}$ wheels, boat trailers and large toy haulers. FIG. 10G shows a top view of a housing for most Class A and Class C motorhomes, charter type buses, tour buses, and semi-trucks. The housings may be different in size and configuration based on the size and type of recreational vehicle that may be stored in the housing. The storage-parking-delivery housings 130a-g may have an "H" shaped main frame 132a-g and an adjustable portion connected to the main frame. The adjustable portion may comprise an extension that can extend and/or retract the length and width of the housing based on the size of the individual RV and/or trailer that may be stored-parked-delivered. FIGS. 10A-10G show the basic shapes and differences between the seven (7) different storage-parking-delivery housings.

As shown in FIG. 10A, Housing #1 130a can store-park-deliver Class B type motorhomes and small Class C motorhomes under 25'. The "H" shaped main frame 132a for Housing #1 may be 9'×7', with the length extensions 134a', 134a" being able to extend the housing's length an additional 6' as needed (3' on both ends), and the width extensions 136a', 136a" being able to extend the housing's width an additional 3' as needed (1'-6" on both ends). The dimensions may range an additional +/−2' for each measurement listed.

As shown in FIG. 10B, Housing #2 130b can store-park-deliver smaller sized travel trailers and boat trailers under 25'. The "H" shaped main frame 132b for Housing #2 may be 9'×7', with the length extensions 134b', 134b" being able to extend the housing's length an additional 6' as needed (3' on both ends), and the width extensions 136b' being able to extend the housing's width an additional 3' as needed (1'-6" on both ends). The dimensions may range an additional +/−2' for each measurement listed.

As shown in FIG. 10C, Housing #3 130c can store-park-deliver most Class C type motorhomes and small Class A type motorhomes up to 35'. The "H" shaped main frame 132c for Housing #3 may be 11'×7'-6", with the length extensions 134c', 134c" being able to extend the housing's length an additional 6' as needed (3' on both ends), and the width extensions 136c', 136c" being able to extend the housing's width an additional 3' as needed (1'-6" on both ends). The dimensions may range an additional +/−2' for each measurement listed.

As shown in FIG. 10D, Housing #4 130d can store-park-deliver medium-large sized travel trailers and boat trailers, and small toy haulers up to 35'. The "H" shaped main frame 132d for Housing #4 may be 11'×7'-6", with the length extensions 134d', 134d" being able to extend the housing's length an additional 6' as needed (3' on both ends), and the width extensions 136d' being able to extend the housing's width an additional 3' as needed (1'-6" on both ends). The dimensions may range an additional +/−2' for each measurement listed.

As shown in FIG. 10E, Housing #5 130e can store-park-deliver most Class A motorhomes and super Class C motorhomes up to 45'. The "H" shaped main frame 132e for Housing #5 may be 14'×8', with the length extensions 134e', 134e" being able to extend the housing's length an additional 7' as needed (3'-6" on both ends), and the width extensions 136e', 136e" being able to extend the housing's width an additional 4' as needed (2' on both ends). The dimensions may range an additional +/−2' for each measurement listed.

As shown in FIG. 10F, Housing #6 130f can store-park-deliver larger sized 5$^{th}$ wheels, boat trailers and large toy haulers. The "H" shaped main frame 132f for Housing #6 may be 14'×8', with the length extensions 134f, 134f' being able to extend the housing's length an additional 7' as needed (3'-6" on both ends), and the width extensions 136f' being able to extend the housing's width an additional 4' as needed (2' on both ends). The dimensions may range an additional +/−2' for each measurement.

As shown in FIG. 10G, Housing #7 may store-park-deliver most Class A and Class C motorhomes, charter type buses, tour buses and semi-trucks. The "H" shaped main frame 132g for Housing #7 may be 14'×8', with the length extensions 134g', 134g" being able to extend the housing's length an additional 7' as needed (3'-6" on both ends), and the width extensions 136', 136g" being able to extend the housing's width an additional 4' as needed (2' on both ends). The dimensions may range an additional +/−2' for each measurement.

Any type or kind of recreational vehicle and trailer may be able to be stored-parked-delivered with the seven different housings listed above.

Figure 11A:
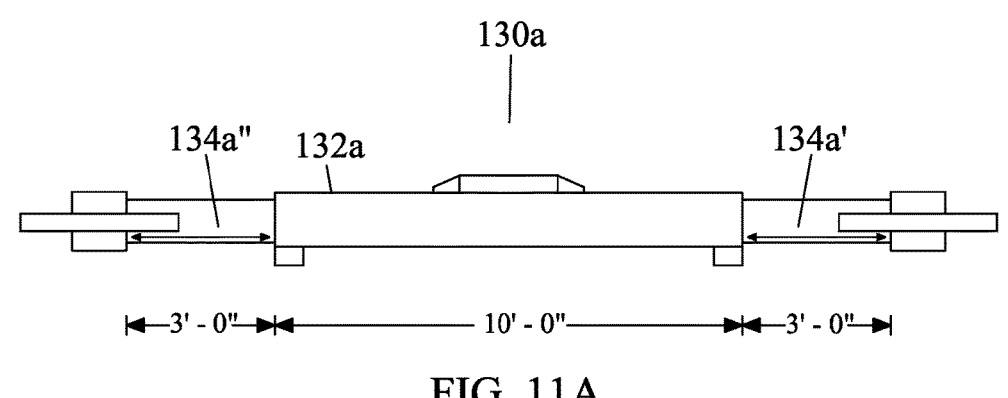
FIG. 11A shows a side view of a housing for Class B type motorhomes and small Class C motorhomes under 25'.
Figure 11B:
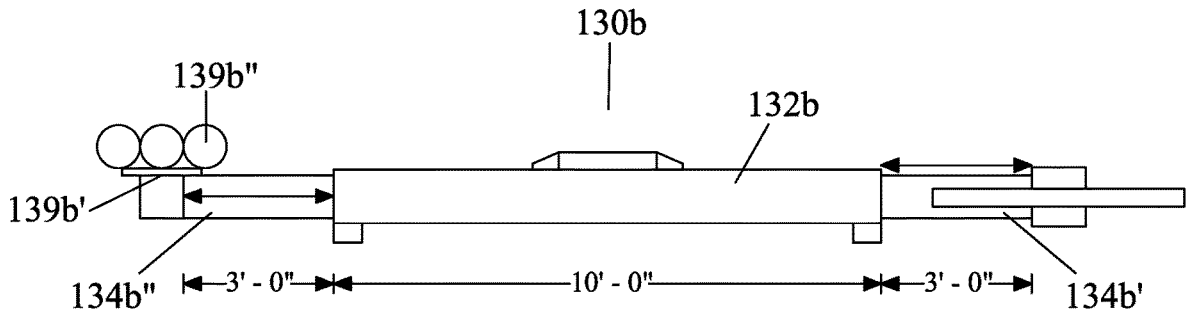
FIG. 11B shows a side view of a housing for smaller sized travel trailers and boat trailers under 25'.
Figure 11C:
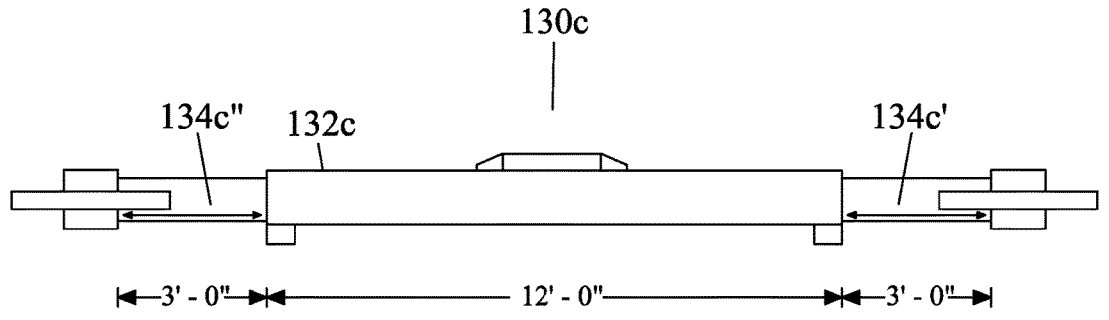
FIG. 11C shows a side view of a housing for most Class C type motorhomes and small Class A type motorhomes up to 35'.
Figure 11D:
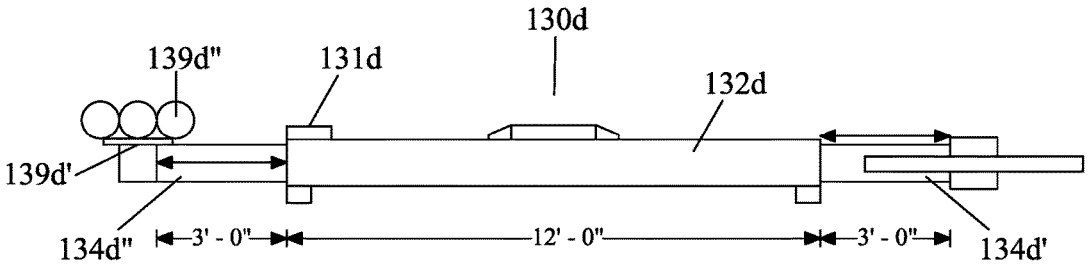
FIG. 11D shows a side view of a housing for medium-large sized travel trailers and boat trailers and small toy haulers up to 35'.
Figure 11E:
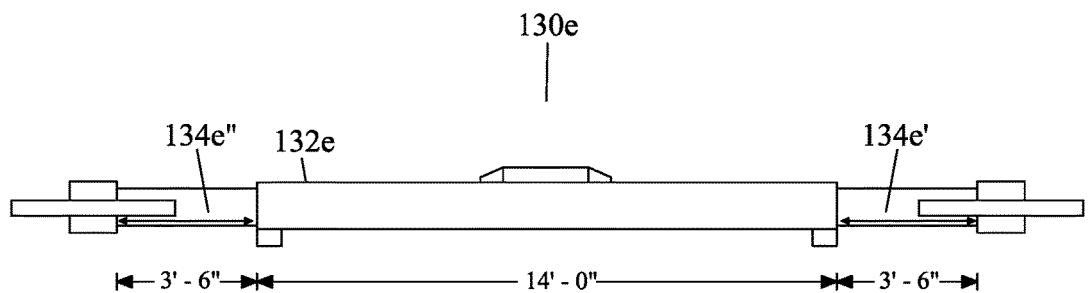
FIG. 11E shows a side view of a housing for most Class A motorhomes and super Class C motorhomes up to 45'.
Figure 11F:
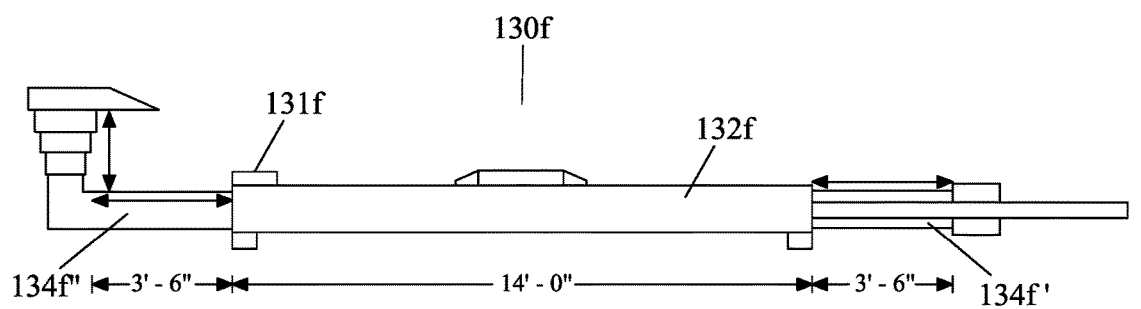
FIG. 11F shows a side view of a housing for larger sized 5$^{th}$ wheels, boat trailers, and large toy haulers.
Figure 11G:
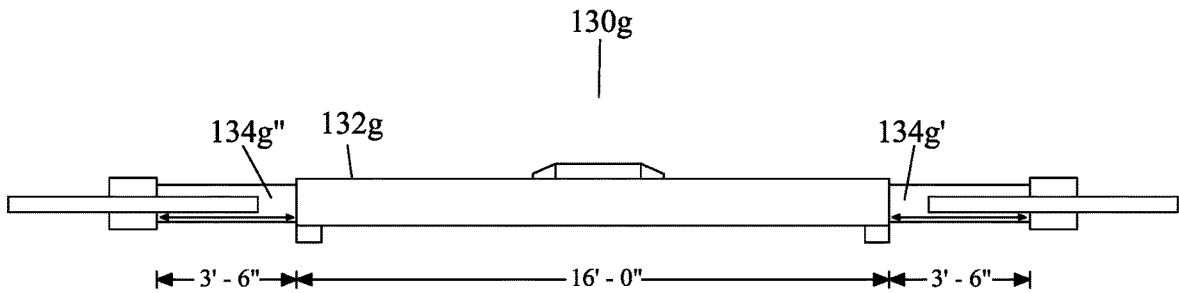
FIG. 11G shows a side view of a housing for most Class A and Class C motorhomes, Charter type buses, tour buses, and semi-trucks.

FIGS. 11A-11F show side views of different housings that may be arranged in the block units. FIG. 11A shows a side view of a housing for Class B type motorhomes and small Class C motorhomes under 25'. FIG. 11B shows a side view of a housing for smaller sized travel trailers and boat trailers under 25'. FIG. 11C shows a side view of a housing for most Class C type motorhomes and small Class A type motorhomes up to 35'. FIG. 11D shows a side view of a housing for medium-large sized travel trailers and boat trailers and small toy haulers up to 35'. FIG. 11E shows a side view of a housing for most Class A motorhomes and super Class C motorhomes up to 45'. FIG. 11F shows a side view of a housing for larger sized 5$^{th}$ wheels, boat trailers and large toy haulers. FIG. 11G shows a side view of a housing for most Class A and Class C motorhomes Charter type buses, tour buses, and semi-trucks.

As shown in FIG. 11A, the "H" shaped main frame 132a for Housing #1 130a may be 10' long×5' wide, with the length extensions 134a', 134a" being able to extend the housing's length an additional 6' as needed (3' on both ends), and the width extensions 136a', 136a" being able to extend the housing's width an additional 4' as needed (2' on both ends). The dimensions may range an additional +/−2' for each of the measurements listed. As shown in FIG. 11C, the "H" shaped main frame 132c for Housing #3 130c may be 12' long×5'-6" wide, with the length extensions 134c', 134c" being able to extend the housing's length an additional 6' as needed (3' on both ends), and the width extensions 136c', 136" being able to extend the housing's width an additional 4' as needed (2' on both ends). The dimensions may range an additional +/−2' for each of the measurements listed.

The housings as shown in FIGS. 11A and 11C may contain a delivery housing controller that receive signals from sensors and the storage-parking-delivery systems (e.g., management systems) technology. A first sensor (e.g., recreational vehicle sensor 334, 336, or 339) positioned near the entry of the storage-parking-delivery facility may trigger the length of the housing to size to the correct distance between the front and rear wheels of the motorhomes that may be stored-parked-delivered. The front length extensions 134a", 134c" may have single wheel supports 138a", 138c" for the front tires of the motorhomes, and the back length extensions 134a', 134c' may have double wheel supports 138a', 138c' for the back tires of the motorhomes.

The adjustable portion (e.g., length and width extensions) may be slightly smaller than the main "H" shaped housing frames, allowing them to slide in or out of the "H" shaped main frame depending on the measurements from the sensor signals. These extensions can be moved by hydraulic, pneumatic and/or electric type controls for the storage-parking-delivery housings.

The storage-parking-delivery housings can run along floor tracks, rails and/or sensors of the facility, with the storage-parking-delivery housings each having 4 track wheels, castors and/or sensors 133a, 133c, at the 4 corners of the main frame that attach to the tracks, rails and/or sensors for guidance and delivery to the final Block Unit. These wheels, castors and/or sensors may be located on the outside of the delivery housings main frame for delivery housings #1 and #3.

As shown in FIG. 11E, the "H" shaped main frame 132e for Housing #5 130e may be 14' long×7' wide, with the length extensions 134e', 134e" being able to extend the housing's length an additional 7' as needed (3'-6" on both ends), and the width extensions 136e', 136e" being able to extend the housing's width an additional 4' as needed (2' on both ends). The dimensions could range an additional +/−2' for each of the measurements listed. As shown in FIG. 11G, the "H" shaped main frame 132g for Housing #7 130g may be 16' long×8' wide, with the length extensions 134g', 134g" being able to extend the housing's length an additional 7' as needed (3'-6" on both ends), and the width extensions 136g', 136g" being able to extend the housing's width an additional 4' as needed (2' on both ends). The dimensions could range an additional +/−2' for each of the measurements listed.

As shown in FIGS. 11E and 11G, the housings may contain a delivery controller that receive signals from sensors and the storage-parking-delivery systems (e.g., management systems) technology. A first sensor (e.g., recreational vehicle sensor 334, 336, or 339) positioned near the entry of the storage-parking-delivery facility may trigger the length of the housing to size to the correct distance between the front and rear wheels of the motorhomes that may be stored-parked-delivered via length extensions. The front length extensions may have larger single wheel supports for the front tires of the motorhomes, and the back length extensions may have larger double wheel supports for the back tires of the motorhomes.

The length and width extensions may be slightly smaller than the main "H" shaped housing frames, allowing them to slide in or out of the "H" shaped main frame depending on the measurements from the sensor signals. These extensions can be moved by hydraulic, pneumatic and/or electric type controls for the storage-parking-delivery housings.

The storage-parking-delivery housings may run along floor tracks, rails and/or sensors of the facility, with the storage-parking-delivery housings each having 4 track wheels, castors and/or sensors 133e, 133g at the 4 corners of the main frame that attach to the tracks, rails and/or sensors for guidance and delivery to the final Block Unit. These wheels, castors and/or sensors may be located on the inside of the delivery housings main frame and can adjust in width for the tracks, rails and/or sensors for delivery housings #5 and #7.

As shown in FIG. 11B, the "H" shaped main frame 132*b* for housing #2 130*b* may be 10' long×5' wide, with the length extensions 134*b'*, 134*b"* being able to extend the housing's length an additional 6' as needed (3' on both ends), and the back-end width extensions 136*b'*, 136" being able to extend the housing's width an additional 4' as needed (2' on both ends). The dimensions could range an additional +/−2' for each of the measurements listed. As shown in FIG. 11D, the "H" shaped main frame 132*d* for housing #4 130*d* may be 12' long×5'-6" wide, with the length extensions 134*d'*, 134*d"* being able to extend the housing's length an additional 6' as needed (3' on both ends), and the back-end width extensions 136*d'*, 136*d"* being able to extend the housing's width an additional 5' as needed (2'-6" on both ends). The dimensions could range an additional +/−2' for each of the measurements listed. As shown in FIG. 11F, the "H" shaped main frame 132*f* for housing #6 130*f* may be 14' long×7' wide, with the length extensions 134*f'*, 134*f'* being able to extend the housing's length an additional 7' as needed (3'-6" on both ends), and the back-end width extensions 136*f'*, 136*f'* being able to extend the housing's width an additional 4' as needed (2' on both ends). The dimensions could range an additional +/−2' for each of the measurements listed.

As shown in FIGS. 11B, 11D, and 11F, the housings may contain a delivery housing controller that receive signals from sensors and the storage-parking-delivery systems (e.g., management systems) technology. A first sensor (e.g., recreational vehicle sensor 334, 336, or 339) positioned near the entry of the storage-parking-delivery facility may trigger the length of the housing to size to the correct distance between the front and rear wheels of the motorhomes that may be stored-parked-delivered.

A second sensor positioned on the side of the entry of the storage-parking-delivery facility may trigger the correct size trailer ball 139*b"*, 138*d"*, 138*f'"* and height of the trailer ball 138*b'*, 138*d'*, 138*f* for housing #2 130*b* and housing #4 130*d* per the trailer being stored-parked-delivered. Different types of travel trailers, boat trailers and toy hauler trailers may have one of 4 differently sized balls, so the front length extensions for storage-parking-delivery housings #2 and #4 may each have one of the 4 differently sized balls which can rotate around to the correct sized ball and height based on the side sensor signals. These 4 differently sized balls may sit on a telescoping platform that may adjust its height up to 2'. The dimensions on the height extension could range an additional +/−1' for the height extension based on the signals received from the last floor sensors and side sensors as needed. The side sensors positioned on the side of the entry of the storage-parking-delivery facility may trigger the correct height for the 5$^{th}$ wheel and gooseneck hitches 138*f* for housing #6 130*f* per the trailer being stored-parked-delivered. The 5$^{th}$ wheel and gooseneck hitches on the storage-parking-delivery housing can adjust its height up to 4'. The dimensions on the height extension could range an additional +/−2' for the height extension based on the signals received from the last floor sensors and side sensors as needed.

The back length extensions for housing #2 may have longer single wheel supports for the back tires of the trailers. The back length extensions for housing #4 may have longer single wheel supports for the back tires of the trailers. The back length extensions for housing #6 may have extra-long single wheel supports for the back tires of the trailers with up to 3 rear axles. A support bracket and support bracket kick-out plates 131*d*, 131*f* may run along the front of the "H" shaped main frame for housings #4 and M. The support bracket can be used for front located levelers, and the support bracket kick-out plates may be flush with the top of the "H" shaped main frame for housings #4 and #6 but can kick outside of the frame to support corner located levelers as needed.

The length and width extensions may be slightly smaller than the main "H" shaped housing frames, allowing them to slide in or out of the "H" shaped main frame depending on the measurements from the sensor signals. These extensions can be moved by hydraulic, pneumatic and/or electric type controls for the storage-parking-delivery housings.

The storage-parking-delivery housings may run along floor tracks, rails and/or sensors of the facility, with the storage-parking-delivery housings each having 4 track wheels, castors and/or sensors 133*b*, 133*d*, 133*f* at the 4 corners of the main frame that attach to the tracks, rails and/or sensors for guidance and delivery to the final block unit. These wheels, castors and/or sensors may be located on the outside of the delivery housings main frame for delivery housing #2, and the wheels, castors and/or sensors may be located on the inside of the delivery housings main frame and can adjust in width for the tracks, rails and/or sensors for delivery housings #4 and #6.

Figure 12A:
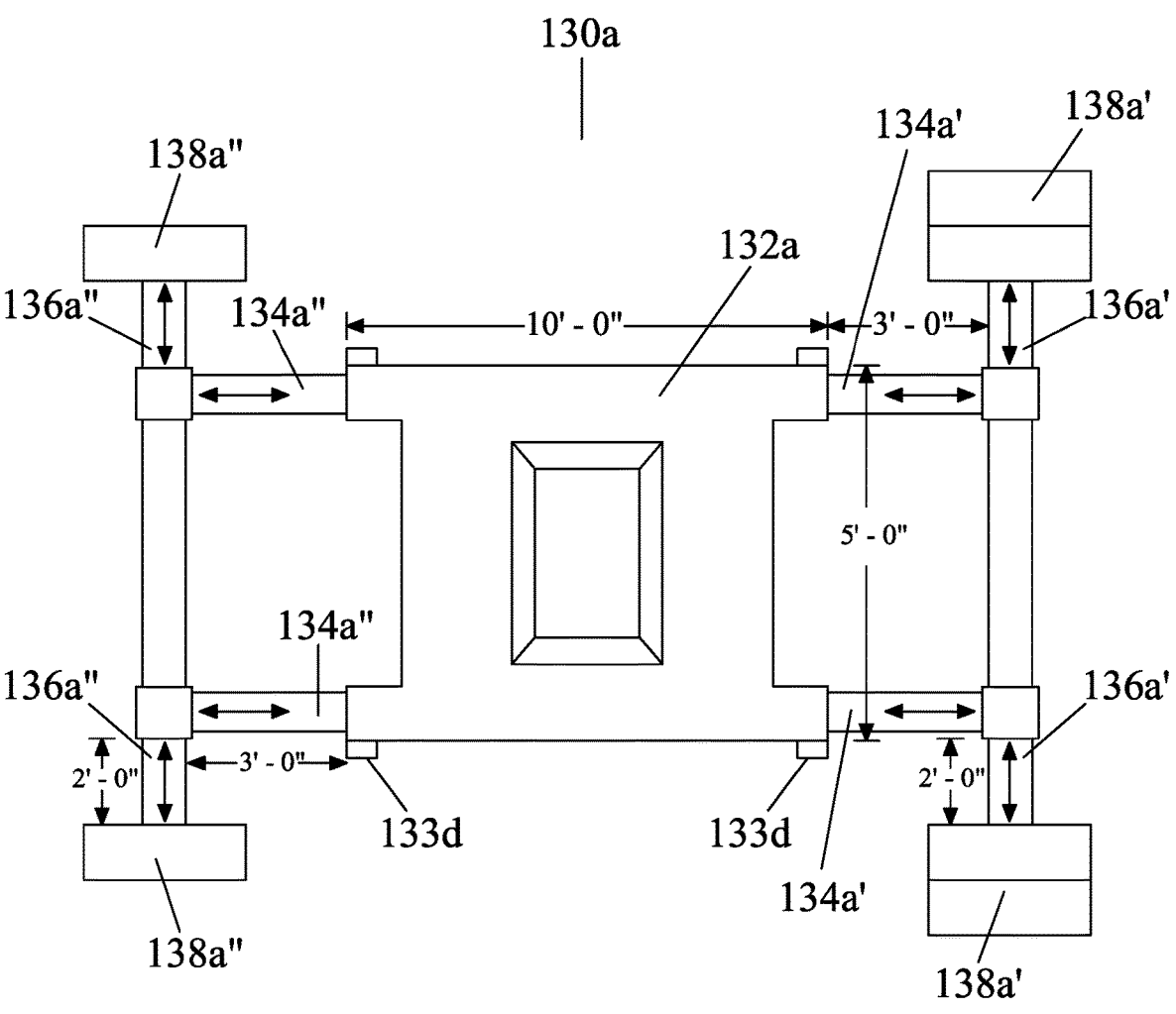
FIG. 12A shows a top view of a housing for Class B type motorhomes and small Class C motorhomes under 25' in total length with length extensions and width extensions.

FIG. 12A shows a top view of a housing for Class B type motorhomes and small Class C motorhomes under 25' in total length with length extensions and width extensions. Storage-parking-delivery housing #1 can be the smallest of the motorhome type housings out of the seven (7) and can store-park-deliver all Class B motorhomes and small class C motorhomes under 25' in total length. The "H" shaped main frame 132*a* for Housing #1 130*a* may be 10' long×5' wide, with the length extensions 134*a'*, 134*a"* being able to extend the housing's length an additional 6' as needed (3' on both ends), and the width extensions 136*a'*, 136*a"* being able to extend the housing's width an additional 4' as needed (2' on both ends). The dimensions could range an additional +/−2' for each of the measurements listed.

The housing may contain a delivery controller that receive signals from sensors and the storage-parking-delivery systems technology. The first sensors positioned near the entry of the storage-parking-delivery facility may trigger the length of the housing to size to the correct distance between the front and rear wheels of the motorhome that may be stored-parked-delivered through back length extensions 134*a'* and front length extensions 134*a"*. The second sensors positioned near the entry of the storage-parking-delivery facility may trigger the width of the housing to size to the correct distance between the outside tires of the front and rear wheels of the motorhome that may be stored-parked-delivered back width extensions 136*a'* and front width extensions 136". The front length extensions may have single wheel supports 138" for the front tires of the motorhomes, and the back length extensions 138*a'* may have double wheel supports for the back tires of the motorhomes.

The length and width extensions may be slightly smaller than the main "H" shaped housing frames, allowing them to slide in or out of the "H" shaped main frame depending on the measurements from the sensor signals. These extensions can be moved by hydraulic, pneumatic and/or electric type controls for the storage-parking-delivery housings.

The storage-parking-delivery housings may run along floor tracks, rails and/or sensors of the facility, with the storage-parking-delivery housings each having 4 track wheels, castors and/or sensors at the 4 corners of the main frame that attach to the tracks, rails and/or sensors for guidance and delivery to the final Block Unit. These wheels, castors and/or sensors may be located on the outside of the delivery housings main frame for delivery housing #1.

Figure 12B:
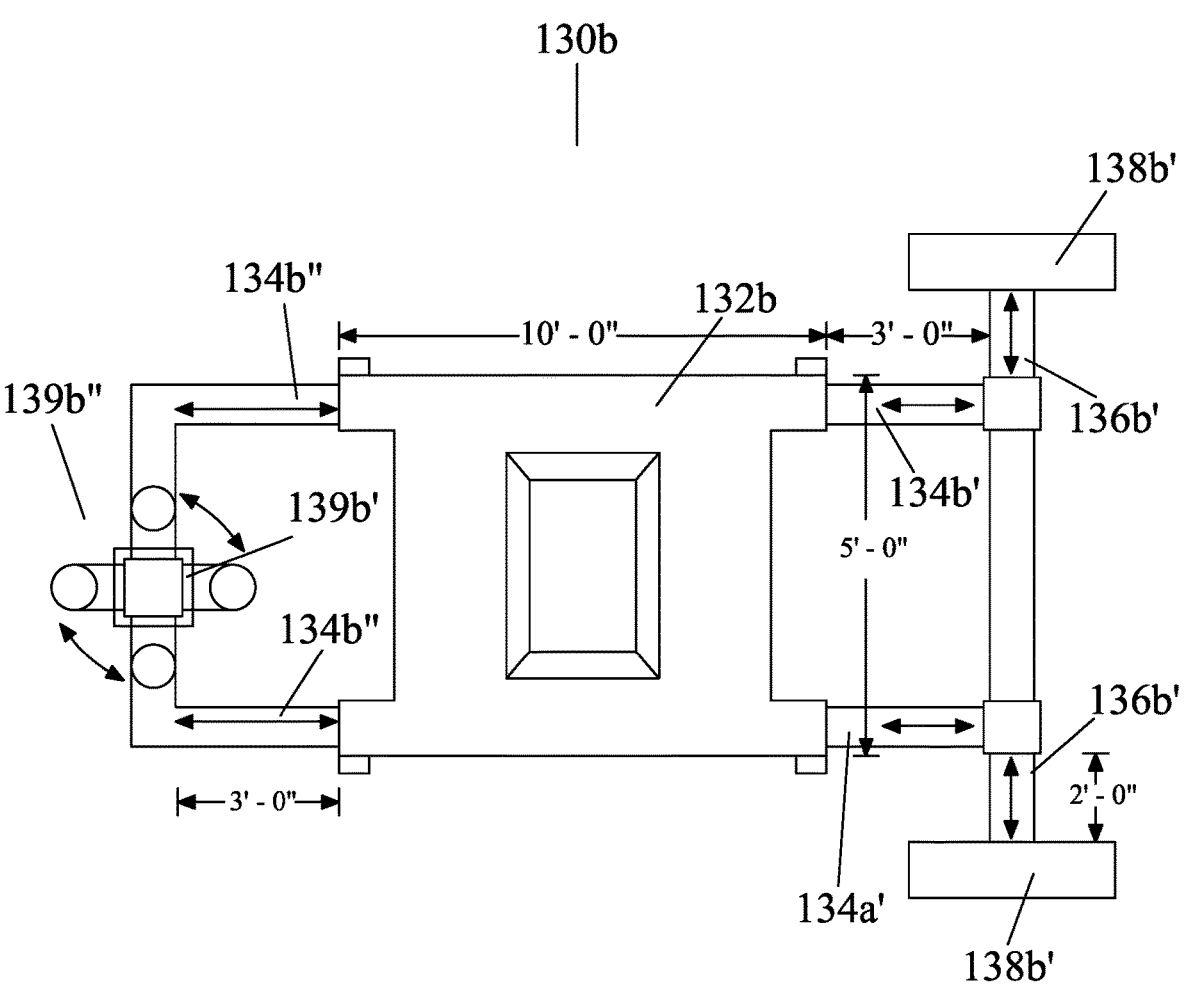
FIG. 12B shows a top view of a housing for smaller sized travel trailers and boat trailers under 25' with length extensions and width extensions.

FIG. 12B shows a top view of a housing for smaller sized travel trailers and boat trailers under 25' with length extensions and width extensions. Storage-parking-delivery housing #2 can be the smallest of the trailer type housings out of the seven and can store-park-deliver small to medium sized travel trailers and boat trailers under 25' in total length. The "H" shaped main frame 132b for housing #2 may be 10' long×5' wide, with the length extensions 134b', 134b" being able to extend the housing's length an additional 6' as needed (3' on both ends), and the back-end width extensions 136b' can extend the housing's width an additional 4' as needed (2' on both ends). The dimensions could range an additional +/−2' for each of the measurements listed.

The housing may contain a delivery housing controller that receive signals from sensors and the storage-parking-delivery systems technology. The first sensors positioned near the entry of the storage-parking-delivery facility may trigger the length of the housing to size to the correct distance between the front and rear wheels of the motorhome that may be stored-parked-delivered through length extensions 134b', 134b". The second sensors positioned near the entry of the storage-parking-delivery facility may trigger the width of the housing to size to the correct distance between the outside tires of the front and rear wheels of the motorhome that may be stored-parked-delivered through width extensions 136b'. The third sensors positioned near the entry of the storage-parking-delivery facility and the side sensors positioned on the side of the entry of the storage-parking-delivery facility may trigger the correct size trailer ball 139b" and can adjust its height up to 2' through telescopic extension 139b'. Different types of travel trailers, boat trailers and toy hauler trailers may have one of 4 differently sized balls, so the front length extensions 134b" for storage-parking-delivery housing #2 may have one of the 4 differently sized balls which can rotate around to the correct sized ball 139b" and height 139b' based on the side sensor signals. These 4 differently sized balls may sit 139b" on a telescoping platform 139b' that can also adjust its height up to 2' based on the signals received from the last floor sensors and side sensors as needed. The back length extensions 134b' may have longer single wheel supports for the back tires of the trailers.

The length and width extensions may be slightly smaller than the main "H" shaped housing frames, allowing them to slide in or out of the "H" shaped main frame depending on the measurements from the sensor signals. These extensions can be moved by hydraulic, pneumatic and/or electric type controls for the storage-parking-delivery housings.

The storage-parking-delivery housings may run along floor tracks, rails and/or sensors of the facility, with the storage-parking-delivery housings each having 4 track wheels, castors and/or sensors 133b at the 4 corners of the main frame that attach to the tracks, rails and/or sensors for guidance and delivery to the final Block Unit. These wheels, castors and/or sensors may be located on the outside of the delivery housings main frame for delivery housing #2.

Figure 12C:
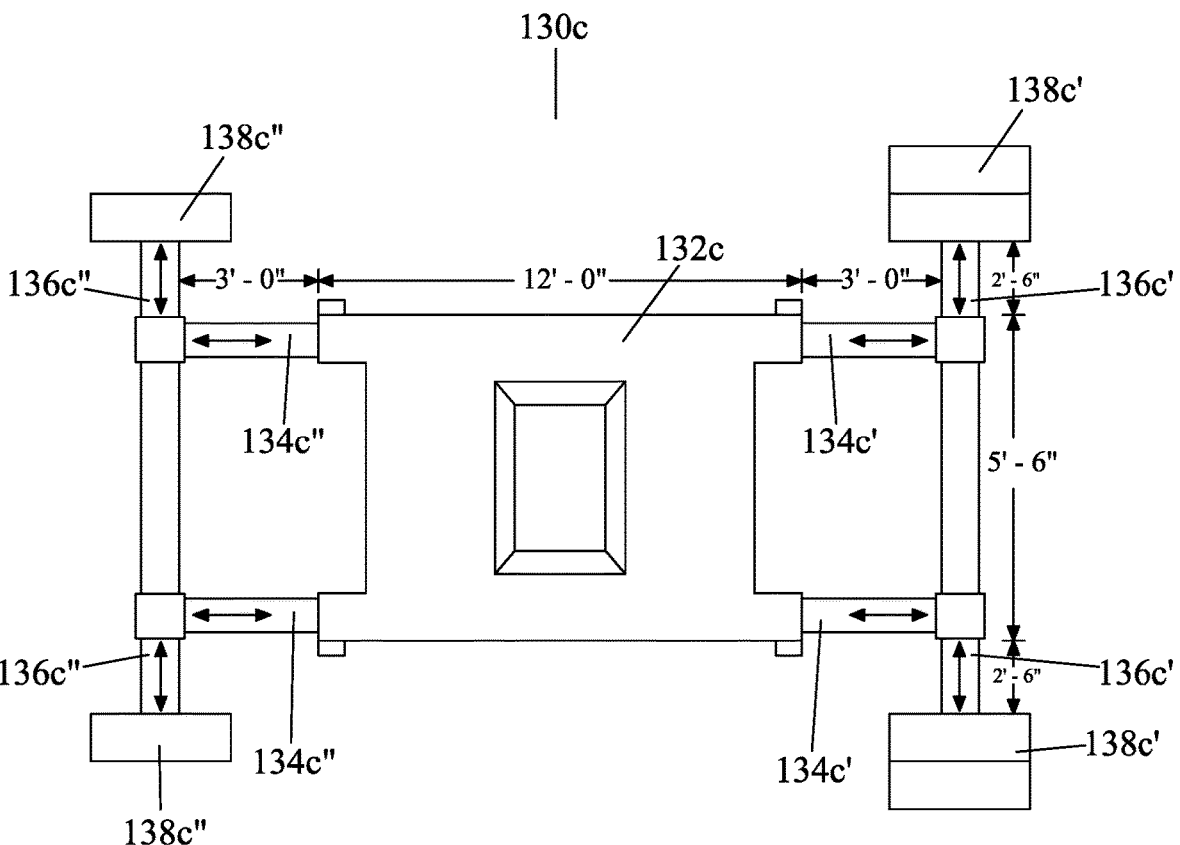
FIG. 12C shows a top view of a housing for most Class C type motorhomes and small Class A type motorhomes up to 35'.

FIG. 12C shows a top view of a housing for most Class C type motorhomes and small Class A type motorhomes up to 35'. Storage-parking-delivery housing #3 may be the second size up from the bottom of the motorhome type housings out of the seven and may be able to store-park-deliver most Class C motorhomes and small class A motorhomes up to 35' in total length. The "H" shaped main frame 132c for Housing #3 may be 12' long×5'-6" wide, with the length extensions being able to extend the housing's length an additional 6' as needed (3' on both ends), and the width extensions being able to extend the housing's width an additional 5' as needed (2'-6" on both ends). The dimensions could range an additional +/−2' for each of the measurements listed.

The housing may contain a delivery housing controller that receive signals from sensors and the storage-parking-delivery systems technology. The first sensors positioned near the entry of the storage-parking-delivery facility may trigger the length of the housing to size to the correct distance between the front and rear wheels of the motorhome that may be stored-parked-delivered via length extensions 134c', 134c". The second sensors positioned near the entry of the storage-parking-delivery facility may trigger the width of the housing to size to the correct distance between the outside tires of the front and rear wheels of the motorhome that may be stored-parked-delivered via width extensions 136c', 136c". The front length extensions 136c" may have single wheel supports for the front tires of the motorhomes, and the back length extensions 136c' may have double wheel supports for the back tires of the motorhomes.

The length 134c', 134c" and width 136c', 136c" extensions may be slightly smaller than the main "H" shaped housing frames, allowing them to slide in or out of the "H" shaped main frame depending on the measurements received from the sensor signals. These extensions can be moved by hydraulic, pneumatic and/or electric type controls for the storage-parking-delivery housings.

The storage-parking-delivery housings may run along floor tracks, rails and/or sensors of the facility, with the storage-parking-delivery housings each having 4 track wheels, castors and/or sensors at the 4 corners of the main frame that attach to the tracks, rails and/or sensors for guidance and delivery to the final Block Unit. These wheels, castors and/or sensors may be located on the outside of the delivery housings main frame for delivery housing #3.

Figure 12D:
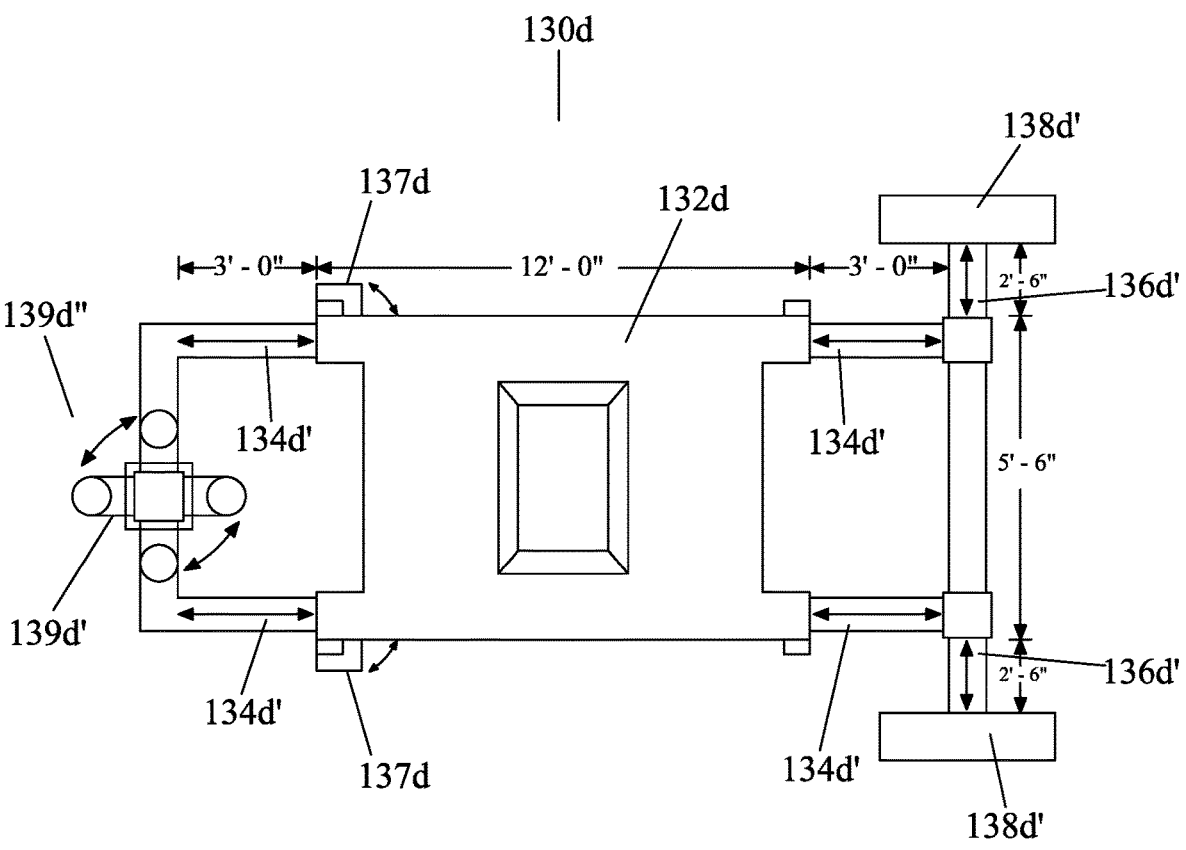
FIG. 12D shows a top view housing for medium-larger sized travel trailers and boat trailers and small toy haulers up to 35'.

FIG. 12D shows a top view housing for medium-large sized travel trailers and boat trailers and small toy haulers up to 35'. Storage-parking-delivery housing #4 may be the middle size of the trailer type housings out of the seven and can store-park-deliver medium to large sized travel trailers and boat trailers and small to medium sized toy haulers up to 35' in total length. The "H" shaped main frame 132d for housing #4 may be 12' long×5'-6" wide, with the length extensions 134d', 134d" being able to extend the housing's length an additional 6' as needed (3' on both ends), and the back-end width extensions 136d', 136d" being able to extend the housing's width an additional 5' as needed (2'-6" on both ends). The dimensions could range an additional +/−2' for each of the measurements listed.

The housing may contain a delivery housing controller that receive signals from sensors and the storage-parking-delivery systems technology. The first sensors positioned near the entry of the storage-parking-delivery facility may trigger the length of the housing to size to the correct distance between the front and rear wheels of the motorhome that may be stored-parked-delivered via length extensions 134d', 134d". The second sensors positioned near the entry of the storage-parking-delivery facility may trigger the width of the housing to size to the correct distance between the outside tires of the front and rear wheels of the motorhome that may be stored-parked-delivered 136d'. The third sensors positioned near the entry of the storage-parking-delivery facility and the side sensors positioned on the side of the entry of the storage-parking-delivery facility may trigger the correct size trailer ball 139d". Different types of travel trailers, boat trailers and toy hauler trailers may have one of 4 differently sized balls 139d", so the front length extensions 134d" for storage-parking-delivery housing #2 may have one of the 4 differently sized balls 139*d*" which can rotate around to the correct sized ball and height 139*d*' based on the side sensor signals. These 4 differently sized balls 139*d*" may sit on a telescoping platform 139*d* that can adjust its height up to 2'. The dimensions on the height extension could range an additional +/−1' for the height extension based on the signals received from the last floor sensors and side sensors as needed.

The back length extensions 134*d*' may have longer single wheel supports for the back tires of the trailers. There may be a support bracket and support bracket kick-out plates 137*d* that may run along the front of the "H" shaped main frame 132*d* for housing #4. The support bracket 135*d* can be with for front located levelers, and the support bracket kick-out plates 137*d* may be flush with the top of the "H" shaped main frame 132*d* for housing #4 but can kick outside of the frame to support corner located levelers as needed.

The length 134*d*', 134*d*" and width extensions 136*d*', 136*d*" may be slightly smaller than the main "H" shaped housing frames, allowing them to slide in or out of the "H" shaped main frame depending on the measurements from the sensor signals. These extensions can be moved by hydraulic, pneumatic and/or electric type controls for the storage-parking-delivery housings.

The storage-parking-delivery housings may run along floor tracks, rails and/or sensors of the facility, with the storage-parking-delivery housings each having 4 track wheels, castors and/or sensors 133*d* at the 4 corners of the main frame that attach to the tracks, rails and/or sensors for guidance and delivery to the final Block Unit. These wheels, castors and/or sensors may be located on the outside of the delivery housings main frame for delivery housing #4.

Figure 12E:
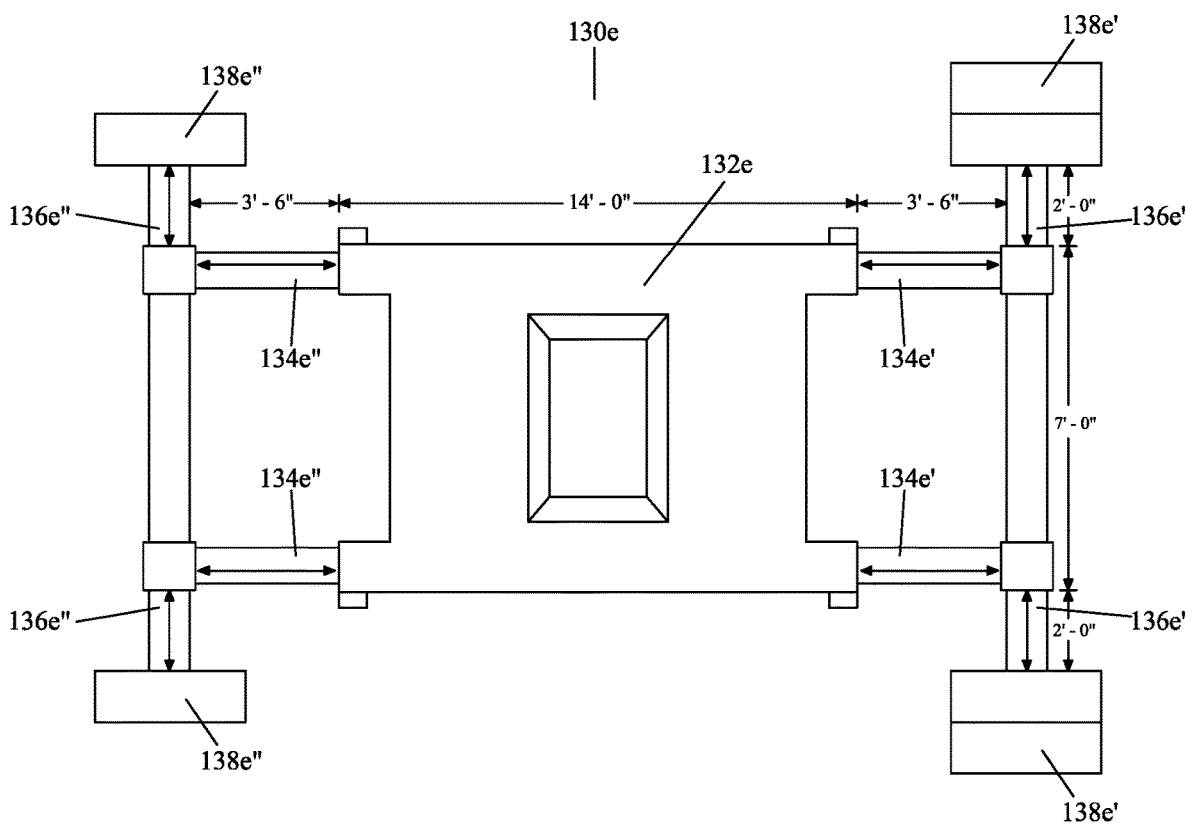
FIG. 12E shows a housing for most Class A and Super Class C motorhomes.

FIG. 12E shows a housing for most Class A and Super Class C motorhomes. Storage-parking-delivery housing #5 may be the second largest size of the motorhome type housings out of the seven (7) and may be able to store-park-deliver most Class A and Super Class C motorhomes. The "H" shaped main frame for Housing #5 may be 14' long×7' wide, with the length extensions being able to extend the housing's length an additional 7' as needed (3'-6" on both ends), and the width extensions being able to extend the housing's width an additional 4' as needed (2' on both ends). The dimensions could range an additional +/−2' for each of the measurements listed.

The housing may contain a delivery housing controller that receive signals from sensors and the storage-parking-delivery systems technology. The first sensors positioned near the entry of the storage-parking-delivery facility may trigger the length of the housing to size to the correct distance between the front and rear wheels of the motor-home that may be stored-parked-delivered via length extensions 134*f*', 134*f*'. The second sensors positioned near the entry of the storage-parking-delivery facility may trigger the width of the housing to size to the correct distance between the outside tires of the front and rear wheels of the motor-home that may be stored-parked-delivered via width extensions 136*f*', 136*f*'. The front length extensions may have larger single wheel supports for the front tires of the moto-rhomes, and the back length extensions may have larger double wheel supports for the back tires of the motorhomes.

The length and width extensions may be slightly smaller than the main "H" shaped housing frames, allowing them to slide in or out of the "H" shaped main frame depending on the measurements received from the sensor signals. These extensions can be moved by hydraulic, pneumatic and/or electric type controls for the storage-parking-delivery housings.

The storage-parking-delivery housings may run along floor tracks, rails and/or sensors of the facility, with the storage-parking-delivery housings each having 4 track wheels, castors and/or sensors at the 4 corners of the main frame that attach to the tracks, rails and/or sensors for guidance and delivery to the final Block Unit. These wheels, castors and/or sensors may be located on the inside of the delivery housings main frame and can adjust in width for the tracks, rails and/or sensors for delivery housing #5.

Figure 12F:
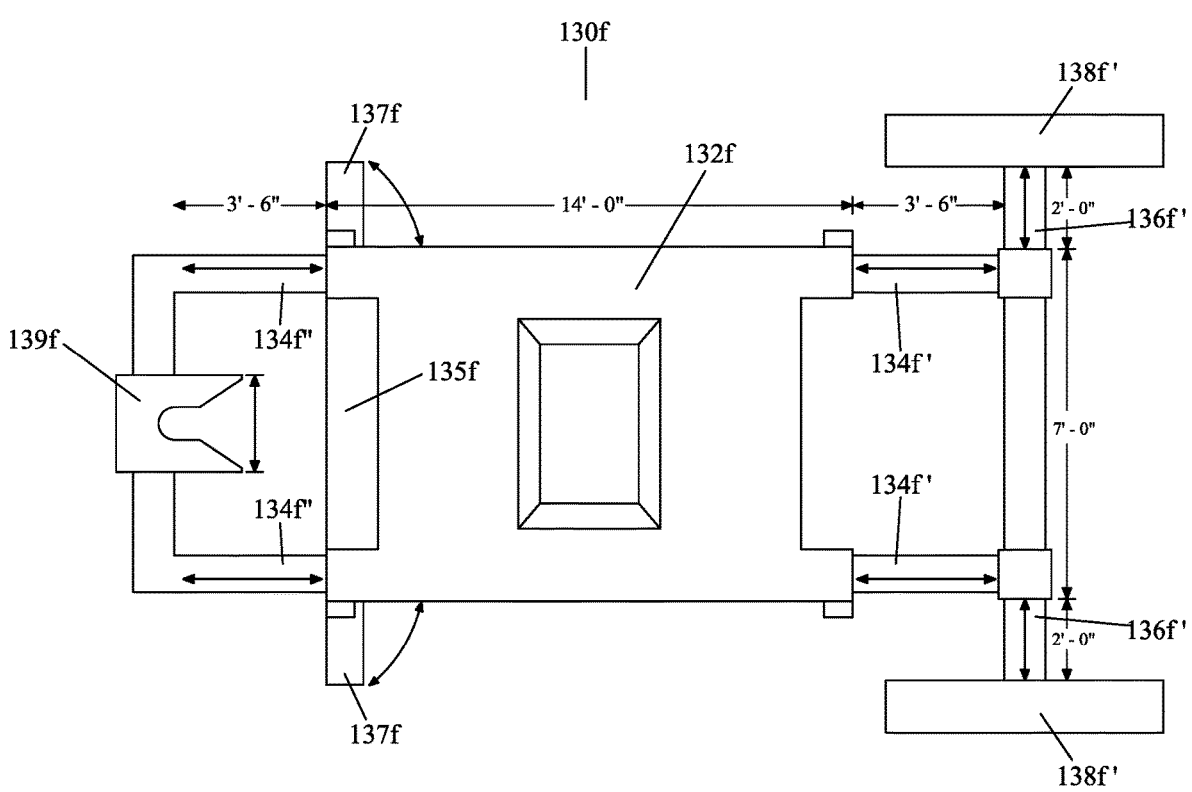
FIG. 12F shows a housing for most 5$^{th}$ wheels and large toy haulers.

FIG. 12F shows a housing for most 5$^{th}$ wheels and large toy haulers. Storage-parking-delivery housing #6 130*f* may be the largest size of the trailer type housings out of the seven and can store-park-deliver extra-large travel trailers and boat trailers and most sized toy haulers. The "H" shaped main frame 132*f* for housing #6 may be 14' long×7' wide, with the length extensions 134*f*', 134*f*' being able to extend the housing's length an additional 7' as needed (3'-6" on both ends), and the back-end width extensions 136*f*' being able to extend the housing's width an additional 4' as needed (2' on both ends). The dimensions may have a tolerance of +/−2' for each of the measurements listed. The housing may contain a delivery housing controller that receive signals from sensors and the storage-parking-delivery systems technology. The first sensors 334 positioned near the entry of the storage-parking-delivery facility may trigger the length of the housing to size to the correct distance between the front and rear wheels of the motorhome that may be stored-parked-delivered via length extensions 134*f*', 134*f*'. The second sensors positioned near the entry of the storage-parking-delivery facility may trigger the width of the housing to size to the correct distance between the outside tires of the front and rear wheels of the motorhome that may be stored-parked-delivered via width extensions 136*f*'. The side sensors positioned on the side of the entry of the storage-parking-delivery facility may trigger the correct height for the 5$^{th}$ wheel and gooseneck hitches on the trailer being stored-parked-delivered via height extension 139*f*. The height on the storage-parking-delivery housing may adjust its height up to 4' extension for the 5$^{th}$ wheel and gooseneck hitches. The dimensions on the height extension may have a tolerance of +/−1' for the height extension based on the signals received from the side sensors as needed.

The back length extensions may have extra-long single wheel supports for the back tires of the trailers with up to 3 rear axles. A support bracket and support bracket kick-out plates 135*f*, 137*f* may run along the front of the "H" shaped main frame for housing #6. The support bracket can be used for front located levelers, and the support bracket kick-out plates may be flush with the top of the "H" shaped main frame for housing #6 but can kick outside of the frame to support corner located levelers as needed.

The length and width extensions may be slightly smaller than the main "H" shaped housing frames, allowing them to slide in or out of the "H" shaped main frame depending on the measurements from the sensor signals. These extensions can be moved by hydraulic, pneumatic and/or electric type controls for the storage-parking-delivery housings.

The storage-parking-delivery housings may run along floor tracks, rails and/or sensors of the facility, with the storage-parking-delivery housings each having 4 track wheels, castors and/or sensors at the 4 corners 133*f* of the main frame that attach to the tracks, rails and/or sensors for guidance and delivery to the final Block Unit. These wheels, castors and/or sensors may be located on the inside of the delivery housings main frame and can adjust in width for the tracks, rails and/or sensors for delivery housing #6.

Figure 12G:
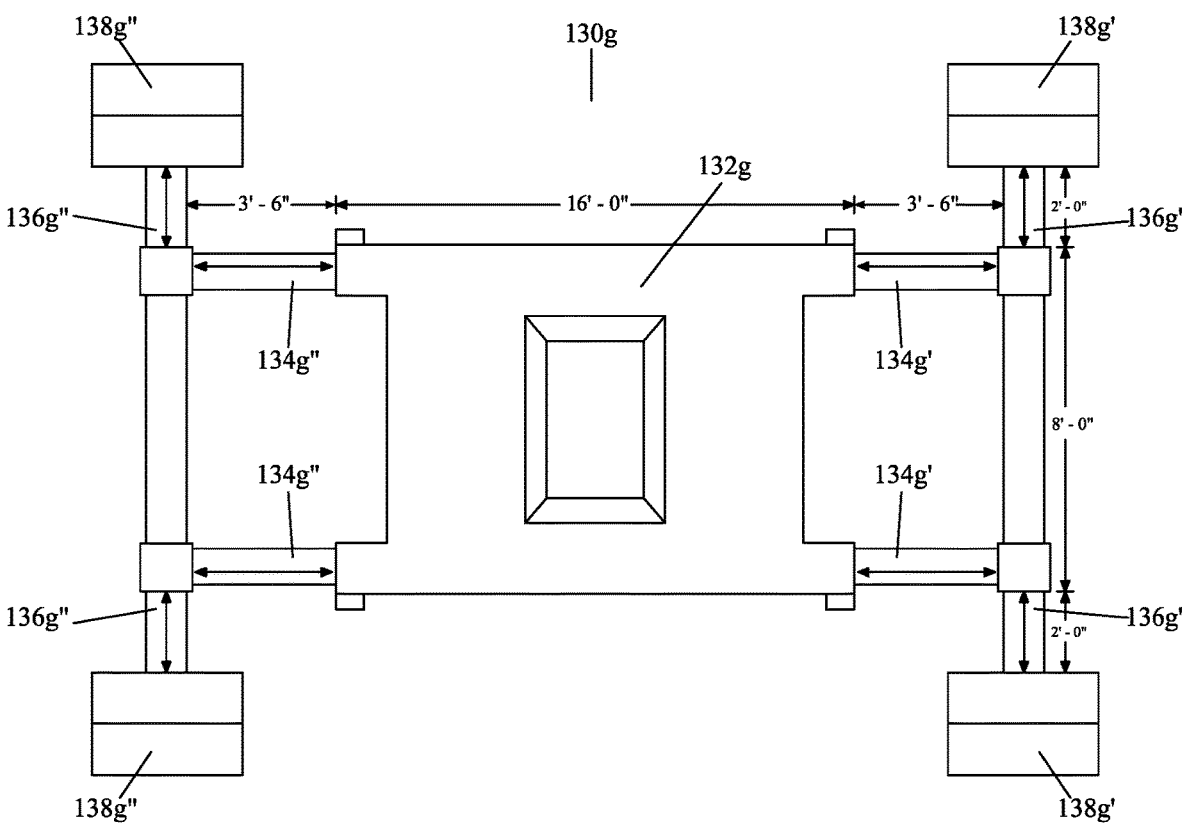
FIG. 12G shows a top view of a housing for most Class A and Class C motorhomes, Charter type buses, tour buses, and semi-trucks.

FIG. 12G shows a top view of a housing for most Class A and Class C motorhomes, charter type buses, tour buses, and semi-trucks. Storage-parking-delivery housing #7 may be the largest size of the motorhome type housings out of the seven and may be able to store-park-deliver most Class A and Super Class C motorhomes, charter and tour buses and semi-trucks. The "H" shaped main frame for Housing #7 may be 16' long×8' wide, with the length extensions being able to extend the housing's length an additional 7' as needed (3'-6" on both ends), and the width extensions being able to extend the housing's width an additional 4' as needed (2' on both ends). The dimensions could range an additional +/−2' for each of the measurements listed.

The housing may contain a delivery housing controller that receive signals from sensors and the storage-parking-delivery systems technology. The first sensors positioned near the entry of the storage-parking-delivery facility may trigger the length of the housing to size to the correct distance between the front and rear wheels of the motorhome that may be stored-parked-delivered via length extensions 134g', 134g". The second sensors positioned near the entry of the storage-parking-delivery facility may trigger the width of the housing to size to the correct distance between the outside tires of the front and rear wheels of the motorhome that may be stored-parked-delivered via width extensions 136g', 136g". The front and back length extensions may have larger double wheel supports for the front and back tires of the motorhomes.

The length and width extensions may be slightly smaller than the main "H" shaped housing frames, allowing them to slide in or out of the "H" shaped main frame depending on the measurements received from the sensor signals. These extensions can be moved by hydraulic, pneumatic and/or electric type controls for the storage-parking-delivery housings.

The storage-parking-delivery housings may run along floor tracks, rails and/or sensors of the facility, with the storage-parking-delivery housings each having 4 track wheels, castors and/or sensors 133g at the 4 corners of the main frame that attach to the tracks, rails and/or sensors for guidance and delivery to the final block unit. These wheels, castors and/or sensors may be located on the inside of the delivery housings main frame and can adjust in width for the tracks, rails and/or sensors for delivery housing #7.

Figure 13A:
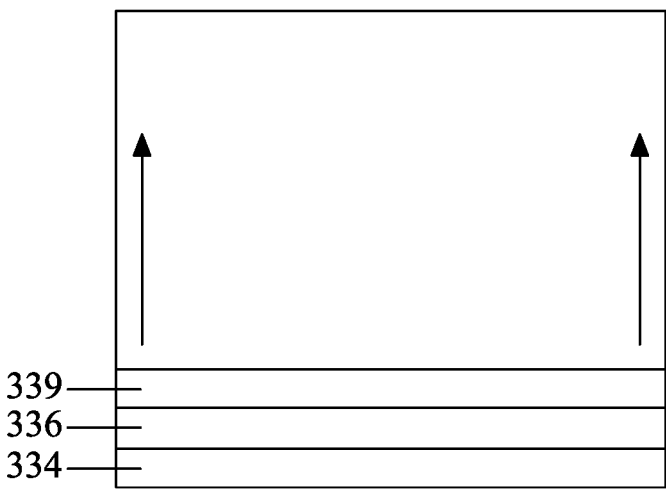
FIG. 13A shows an overhead view of the floor and/or driveway into a storage-parking-delivery type of facility.
Figure 13B:
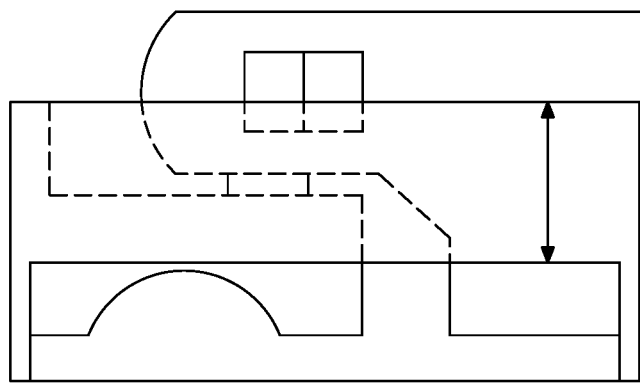
FIG. 13B shows a side view of the side sensors in the storage-parking-delivery type of facility.
Figure 14A:
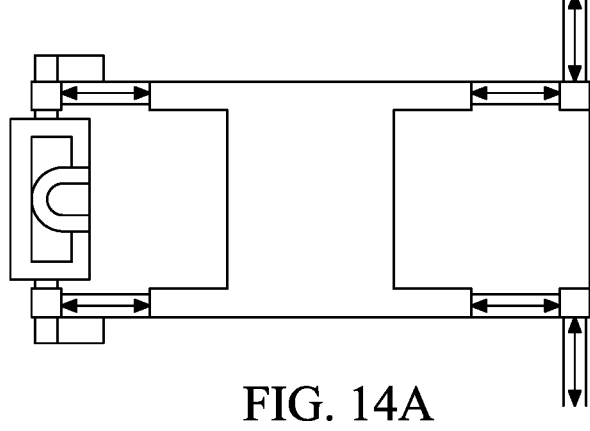
FIG. 14A shows a top view of a housing for containing a 5$^{th}$ wheel trailer.
Figure 14B:
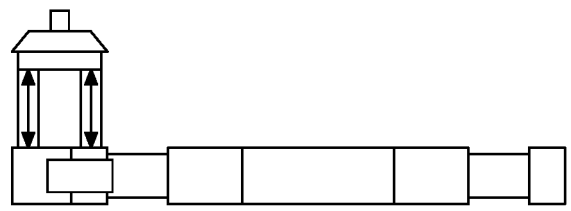
FIG. 14B shows a side view of a housing for containing a 5$^{th}$ wheel trailer.
Figure 15A:
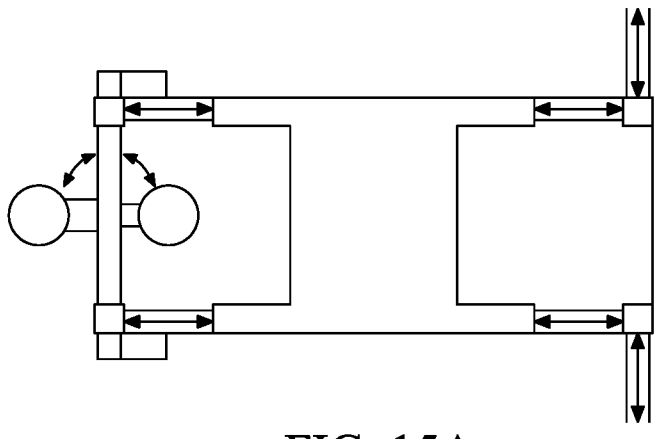
FIG. 15A shows a top view of a housing for containing a travel trailer.
Figure 15B:
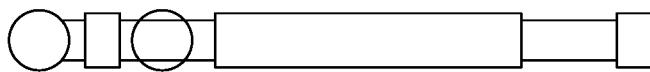
FIG. 15B shows a side view of a housing for containing a travel trailer.

FIGS. 13A, 13B, 14A, 14B, 15A, and 15B show how the four (4) different sensors (3 in the floor and 1 on the side) interact with the travel trailer and 5$^{th}$ wheel storage-parking-delivery housings and hitches. FIG. 13A shows an overhead view of the floor and/or driveway into a storage-parking-delivery type of facility. FIG. 13B shows a side view of the side sensors into the storage-parking-delivery type of facility. FIG. 14A shows a top view of a housing for containing a 5$^{th}$ wheel trailer. FIG. 14B shows a side view of a housing for containing a 5$^{th}$ wheel trailer. FIG. 15A shows a top view of a housing for containing a travel trailer. FIG. 15B shows a side view of a housing for containing a travel trailer. Travel trailer may include small travel trailers as shown in FIG. 12B and large trailers as shown in FIG. 12D. The first sensors 334 may be positioned near the entry of the facility. When a recreational vehicle contacts the first sensors 334, the first sensors 334 may trigger the length extension 134b', 134b' to adjust the length of the housing to the distance between the front and rear wheels of the recreational vehicle, and/or back wheels and front supports for 5$^{th}$ wheel and travel trailers. The second sensors 336 may be positioned near the entry of the facility. When a recreational vehicle contacts the second sensors 336, the second sensors 336 may trigger the width extensions 136b', 136b" of the housing to adjust the width of the housing to the distance between the outside tires of the front and rear wheels of the RV, and/or back wheels and front supports for 5$^{th}$ wheel and travel trailers. The third sensors 339 may be positioned near the entry of the storage-parking-delivery facility and the side sensors positioned on the side of the entry of the storage-parking-delivery facility may trigger the correct size trailer ball (Figures C in Sketch 12) and can adjust travel trailer height up to 2' and 5$^{th}$ wheel trailer height up to 4'. The dimensions on the height extension could range an additional +/−1' for the travel trailer height extension and an additional +/−2' for 5$^{th}$ wheel trailer height based on the signals received from the last floor sensors and side sensors as needed. Different types of travel trailers, boat trailers and toy hauler trailers may have one of 4 differently sized balls, so the front length extensions for storage-parking-delivery housing may have one of the 4 differently sized balls which can rotate around to the correct sized ball and height based on the side sensor signals.

The management system may be automated by a control system. The control system may have a main controller, such as a programmable logic controller (PLC) or micro-controller, and sensors. When an RV is positioned on the first turntable, a sensor may detect that the RV is positioned on the first turntable and sends a signal to the main controller. The main controller may process the signal or information received from the sensor. The main controller may also process information, such as reservation information, received from the driver of the car through their phone, controls near the entrance of the facility, or self-serve kiosk near the facility (e.g., registration office) or the employee entering information into a computer. The driver or employee may input information after the driver has positioned the recreational vehicle on the first turntable, the driver has exited the recreational vehicle, and the recreational vehicle is detached, for example, from another recreational vehicle (e.g., tow vehicle), if there is one. The phone, controls near the entrance of the facility, self-serve kiosk, or computer communicates with the control system. The main controller may receive information (e.g., reservation number, block unit number, etc.) from the driver or employee and the sensor and information from the sensor and may process the information to determine whether any signal and what signal should be communicated. Based on one or both pieces of information, a signal may be communicated to the main controller, and the main controller may activate the latch mechanisms to secure the recreational vehicle onto the first turntable. Based on one or both pieces of information, the main controller may communicate a signal to a sensor on the delivery housing that is of the proper size and configuration for the recreational vehicle to align with the entrance or first turntable where the recreational vehicle is positioned. The sensor on the delivery housing and the sensors on the rail may communicate with each other and with the main controller to move the delivery housing to align with the first turntable. The sensor on the delivery housing and the sensor on the rail may communicate with each other to stop the delivery housing when the delivery housing is aligned with the first turntable. The main controller may communicate instructions for the delivery housing to extend or retract its dimensions based on sensor information about the recreational vehicle size, type, and configuration and/or information inputted by the driver or employee. The delivery housing may have its own delivery housing controller to communicate instructions to the extensions to extend or retract. The main controller may communicate instructions to the first turntable containing the recreational vehicle to move into the delivery housing. The rail sensor may position the first turntable precisely into the delivery housing. The first turntable may also have a sensor to communicate with the main controller and the delivery housing. When the recreational vehicle is inside the housing, the main controller may communicate instructions to the first turntable to unlatch the recreational vehicle from itself. The main controller may communicate instructions to the first turntable to return to its original position. The main controller may communicate instructions to the delivery housing to extend or retract the extensions (e.g., length, weight, height, balls, tires) so the recreational vehicle is secured within the delivery housing. When the recreational vehicle is secured within the delivery housing, the main controller may communicate with the sensors on the delivery housing and/or rail sensors and/or second turntable sensors if the second turntable is a separate component from the delivery housing to move the delivery housing along a path to a designated block unit. When the delivery housing with the recreational vehicle is delivered into the block unit, the delivery housing may trigger a sensor in the block unit or the sensor on the delivery housing may communicate with a sensor in the block unit to coordinate the delivery of the recreational vehicle from the delivery into the block unit. When an authorized person summons a recreational vehicle from the block unit, the main controller may communicate with the block unit sensor, rail sensors, delivery housing sensor, first turntable sensor, and optionally second turntable sensor to coordinate delivery of the recreational vehicle to the first turntable. The sensors may be a through-beam sensor, magnetic sensor, machine vision sensor, and/or infrared reflective sensors.

Figure 16:
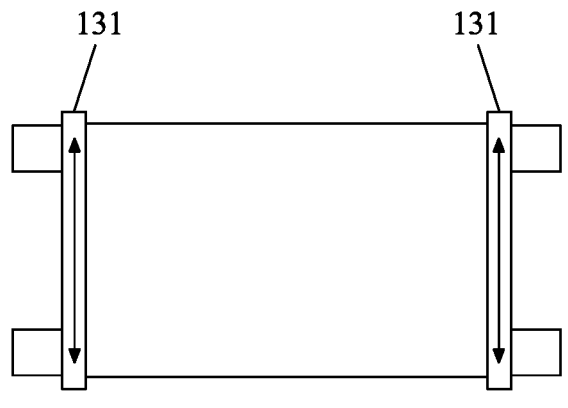
FIG. 16 shows a view of an underside of a delivery housing.

FIG. 16 shows a view of an underside of a delivery housing. The seven different delivery housings may have different widths. Channels 131 on the underside of the housing may allow the casters, wheels and/or sensors to be adjusted width wise to fit the size of the tracks, rails and/or sensors of the movement system 300 in the facility. If a facility is using all seven (7) housings (e.g., for storage and/or parking), the tracks, rails and/or sensors may be 6' wide with a tolerance of +/−2' for that facility. If a facility is only allowing certain size RVs and/or travel trailers (e.g., an RV park only allowing 35'+ sized Class A and Super Class C RVs), the tracks, rails and/or sensors width may be set up based on the width of the delivery housings. For example, delivery housing #5 may be 7' wide so the tracks, rails and/or sensors width may be 7' wide). The caster, wheels and/or sensors channels may allow for any of the different delivery housings to work on any width tracks, rails, and/or sensors.

Figure 17A:
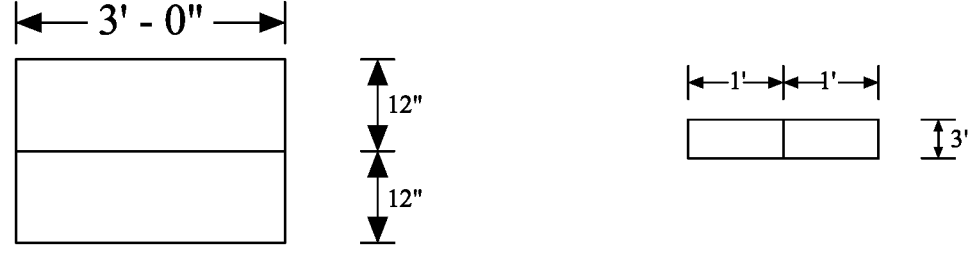
FIG. 17A shows the length, width, and thickness sizes of the backend wheel supports for a housing for Class B type motorhomes and small Class C motorhomes under 25'.
Figure 17B:
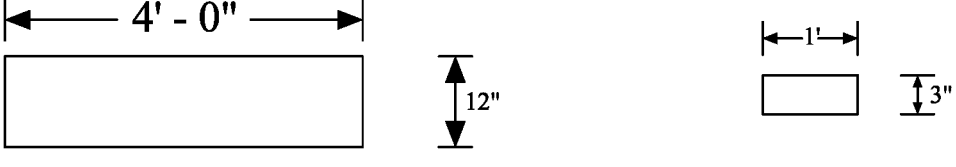
FIG. 17B shows the length, width, and thickness sizes of the backend wheel supports for a housing for smaller sized travel trailers and boat trailers under 25'.
Figure 17C:
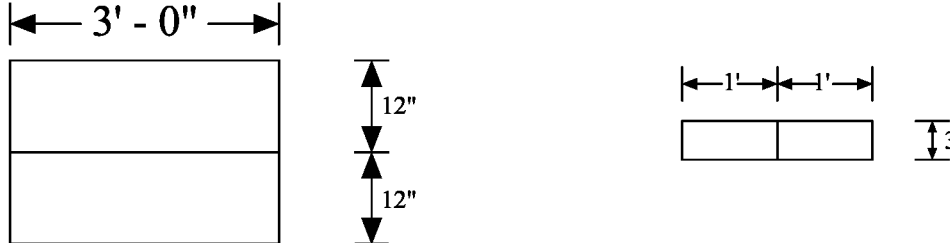
FIG. 17C shows the length, width, and thickness sizes of the backend wheel supports for a housing for most Class C type motorhomes and small Class A type motorhomes up to 35'.
Figures 17D, 17E, 17F, 17G:
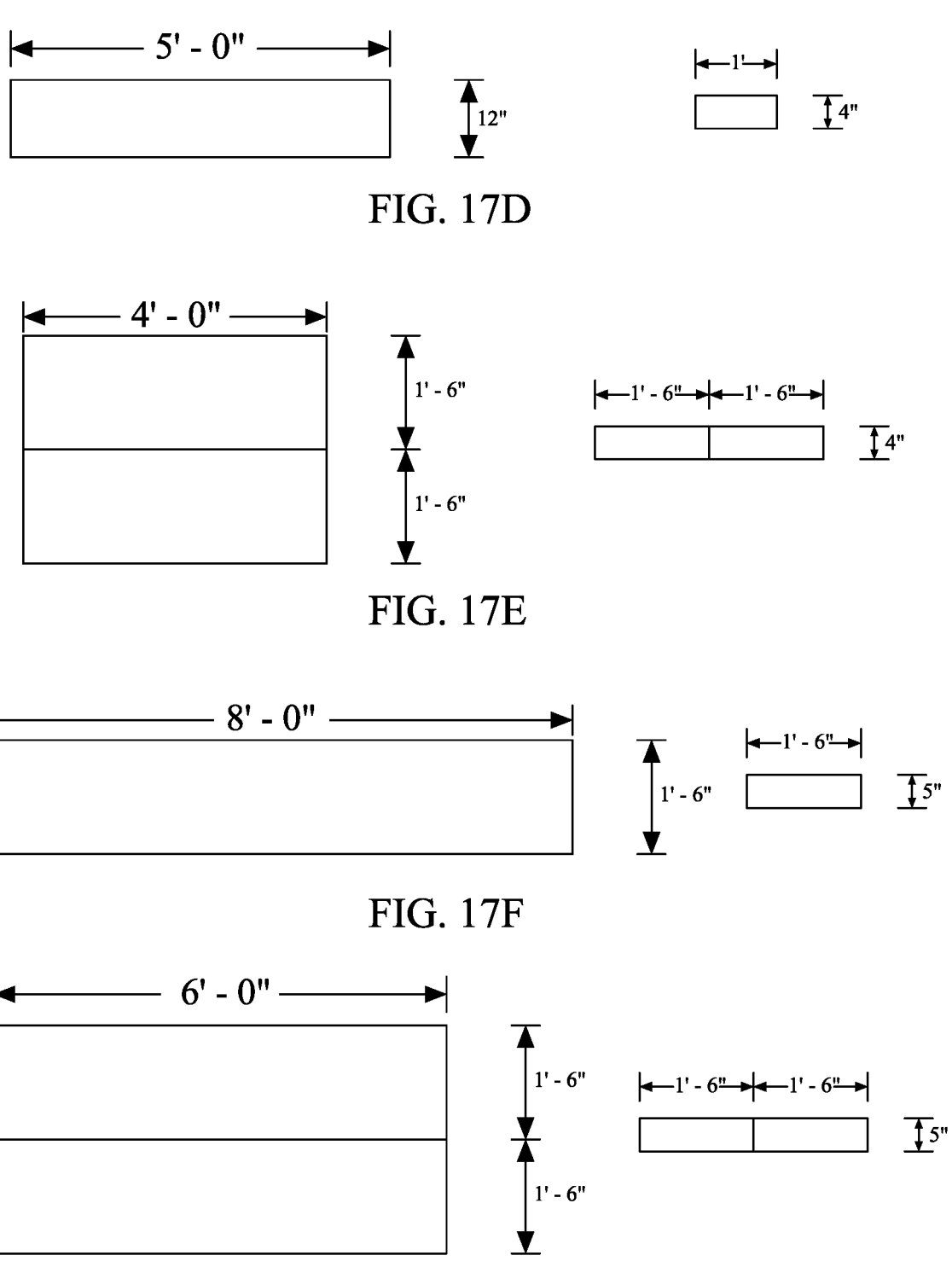
FIG. 17D shows the length, width, and thickness sizes of the backend wheel supports for a housing for medium-larger sized travel trailers and boat trailers and small toy haulers up to 35'.
FIG. 17E shows the length, width, and thickness sizes of the backend wheel supports for a housing for most Class A motorhomes and super Class C motorhomes up to 45'.
FIG. 17F shows the length, width, and thickness sizes of the backend wheel supports for a housing for larger sized 5$^{th}$ wheels, boat trailers and large toy haulers.
FIG. 17G shows length, width, and thickness sizes of the backend wheel supports for a housing for most Class A and Class C motorhomes, Charter type buses, tour buses, and semi-trucks.

FIGS. 17A-17G show length, width, and thickness sizes of the backend wheel supports for each of the seven different delivery housings. FIG. 17A shows length, width, and thickness sizes of the backend wheel supports for a housing for Class B type motorhomes and small Class C motorhomes under 25'. FIG. 17B shows length, width, and thickness sizes of the backend wheel supports for a housing for smaller sized travel trailers and boat trailers under 25'. FIG. 17C shows length, width, and thickness sizes of the backend wheel supports for a housing for most Class C type motorhomes and small Class A type motorhomes up to 35'. FIG. 17D shows length, width, and thickness sizes of the backend wheel supports for a housing for medium-large sized travel trailers and boat trailers and small toy haulers up to 35'. FIG. 17E shows length, width, and thickness sizes of the backend wheel supports for a housing for most Class A motorhomes and super Class C motorhomes up to 45'. FIG. 17F shows length, width, and thickness sizes of the backend wheel supports for a housing for larger sized 5$^{th}$ wheels, boat trailers and large toy haulers. FIG. 17G shows length, width, and thickness sizes of the backend wheel supports for a housing for most Class A and Class C motorhomes, charter type buses, tour buses, and semi-trucks. These wheel supports may be attached to the adjustable portions (e.g., length and width extensions), which may be attach to the delivery housing main frames.

As shown in FIG. 17G, Housing #7 may have backend wheel supports of 6' long×3' wide×5" thick, which may have a tolerance of +/−12" for each of the measurements listed. As shown in FIG. 17F, Housing #6 may have backend wheel supports of 8' long×1'-6" wide×5" thick, which may have a tolerance of +/−12" for each of the measurements listed. As shown in FIG. 17E, Housing #5 may have backend wheel supports of 4' long×3' wide×4" thick, which may have a tolerance of +/−12" for each of the measurements listed. As shown in FIG. 17D, Housing #4 may have backend wheel supports of 5' long×1' wide×4" thick, which may have a tolerance of +/−12" for each of the measurements listed. As shown in FIG. 17C, Housing #3 may have backend wheel supports of 3' long×2' wide×3" thick, which may have a tolerance of +/−12" for each of the measurements listed. As shown in FIG. 17B, Housing #2 may have backend wheel supports of 4' long×1' wide×3" thick, which may have a tolerance of +/−12" for each of the measurements listed. As shown in FIG. 17A, Housing #1 may have backend wheel supports of 3' long×2' wide×3" thick, which may have a tolerance of +/−12" for each of the measurements listed.

FIGS. 18A-18D show views of the how the four (4) different sized trailer balls may rotate at the front of the storage-parking-delivery housings #2 and #4. Different types of travel trailers, boat trailers and toy hauler trailers may have one of 4 differently sized trailer hitch balls, so the front length extensions for storage-parking-delivery housing may have each of the 4 differently sized balls which can rotate around to the correct sized ball and height based on the side sensor signals. FIGS. 18A-18D show only 2 different sized balls for reference in the component being able to rotate through a total of 4 different sized trailer balls.

Figure 18A:
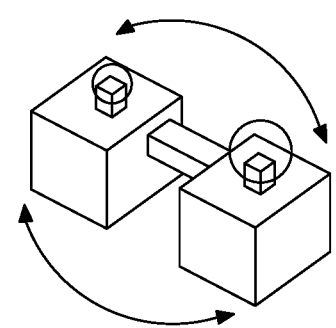
FIG. 18A shows a 3-D perspective of how the balls rotate around the front of the storage-parking-delivery housings.
Figure 18B:
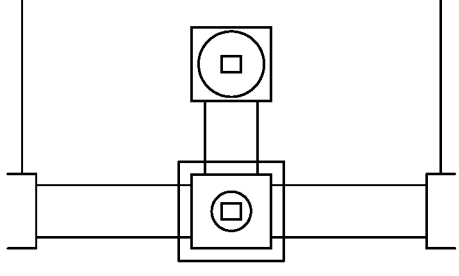
FIG. 18B shows an overhead view of the storage-parking-delivery housing and how the balls rotate around the front of the storage-parking-delivery housings.
Figure 18C:
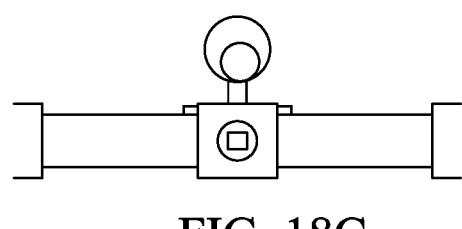
FIG. 18C shows a front view of the storage-parking-delivery housing and a reference of different sized balls that rotate around the front of the storage-parking-delivery housings.
Figure 18D:
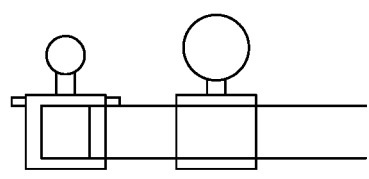
FIG. 18D shows a side view of the storage-parking-delivery housing and a reference of different sized balls that rotate around the front of the storage-parking-delivery housings.

FIG. 18A shows a 3-D perspective of how the balls rotate around the front of the storage-parking-delivery housings. FIG. 18B shows an overhead view of the storage-parking-delivery housing and how the balls rotate around the front of the storage-parking-delivery housings. A telescopic type of platform may allow the height of the trailer balls to be adjusted up to 2'. The dimensions on the height extension may have a tolerance of +/−1' in addition to the selection of the correct sized trailer ball. FIG. 18C shows a front view of the storage-parking-delivery housing and a reference of different sized balls that rotate around the front of the storage-parking-delivery housings. A telescopic type of platform may allow the height of the trailer balls to be adjusted up to 2' in addition to the selection of the correct sized trailer ball. FIG. 18D shows a side view of the storage-parking-delivery housing and a reference of different sized balls that rotate around the front of the storage-parking-delivery housings. A telescopic type of platform may allow the height of the trailer balls to be adjusted up to 2', but the dimensions on the height extension may have a tolerance of +/−1' in addition to the selection of the correct sized trailer ball.

Figure 19A:
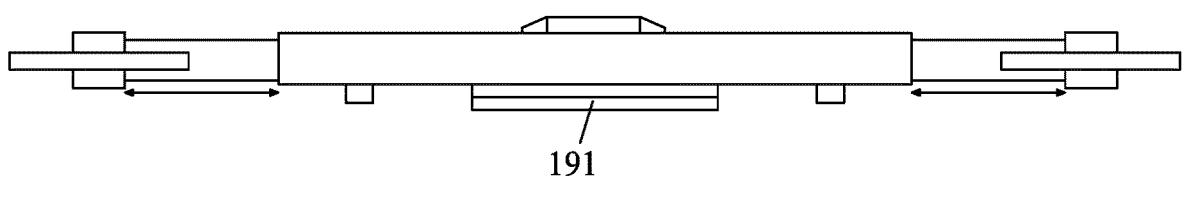
FIG. 19A shows a side view of a delivery housing with an attached interior turntable.

FIG. 19A shows a side view of a delivery housing with an attached interior turntable. In some cases, the interior turntable may be a separate component from the delivery housing that is part of the delivery system. In such cases, the interior turntable can rotate with the turntable tracks and/or rails. In some cases, the interior turntable 191 may be a component attached to the delivery housing as shown in FIG. 19A. In such cases, the interior turntable 191 may be under the delivery housing. The interior turntable 191 may operate independently to rotate the delivery housing or cooperatively with an interior turntable component that is part of the delivery system. The interior turntable component that is part of the delivery system may have a base that is located just below the height of the tracks and/or rails and can be positioned under the delivery housing to cooperate with the turntable components (e.g., interior turntable 191) under the delivery housing. An interior turntable 191 that is attached to the delivery housing may allow the delivery housing to turn and rotate 360 degrees in any direction. An attached interior turntable 191 may more precisely position the delivery housing than a separate interior turntable 190 on the rails. With the interior turntable 191 attached to the delivery housing, less space may be used in the facility to accommodate an interior turntable that is separate from the delivery housing. The space saved from an interior turntable separate from the delivery housing may be used for other purposes, such as more storage for recreational vehicles.

Figure 19B:
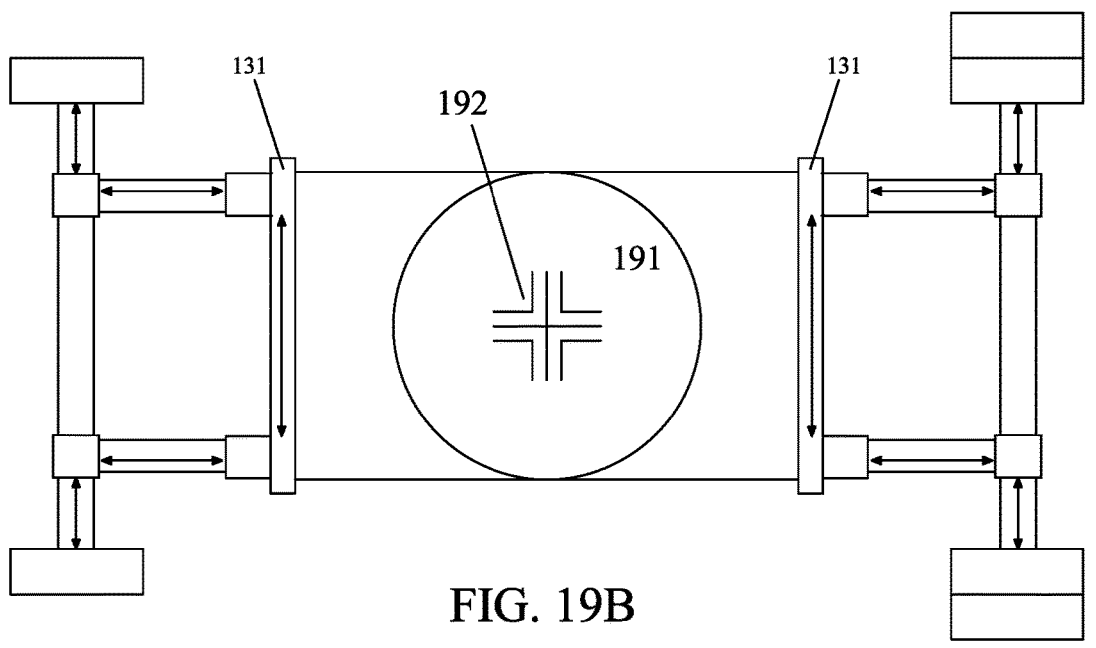
FIG. 19B shows an underside view of a delivery housing with an attached interior turntable.

FIG. 19B shows an underside view of a delivery housing with an attached interior turntable. The underside of the delivery housing may have at least one channel 131 that may allow the casters, wheels and/or sensors to be adjusted width wise to fit the size of the tracks, rails and/or sensors in the facility. The delivery housings can extend length wise via length extensions and width wise via width extensions.

An interior turntable bracket 192 may be position on the bottom or underside of the turntable 192. The shape of an interior turntable bracket 192 may be a cross or plus sign. The interior turntable bracket 192 may fit into brackets built into the delivery tracks, rails and/or sensors system where an interior turntable 190 could be installed on the rails as a separate component from the delivery housing as shown in FIGS. 5, 7A, and 7B. The base of the turntable may be able to extend or retract to allow 360 degrees rotation of the interior turntable and the delivery housing. The interior turntable may extend into or retract from the delivery tracks, and rails and/or sensor brackets provide stabilization as the top of the turntable can rotate 360 degrees in any direction.

Figure 20:
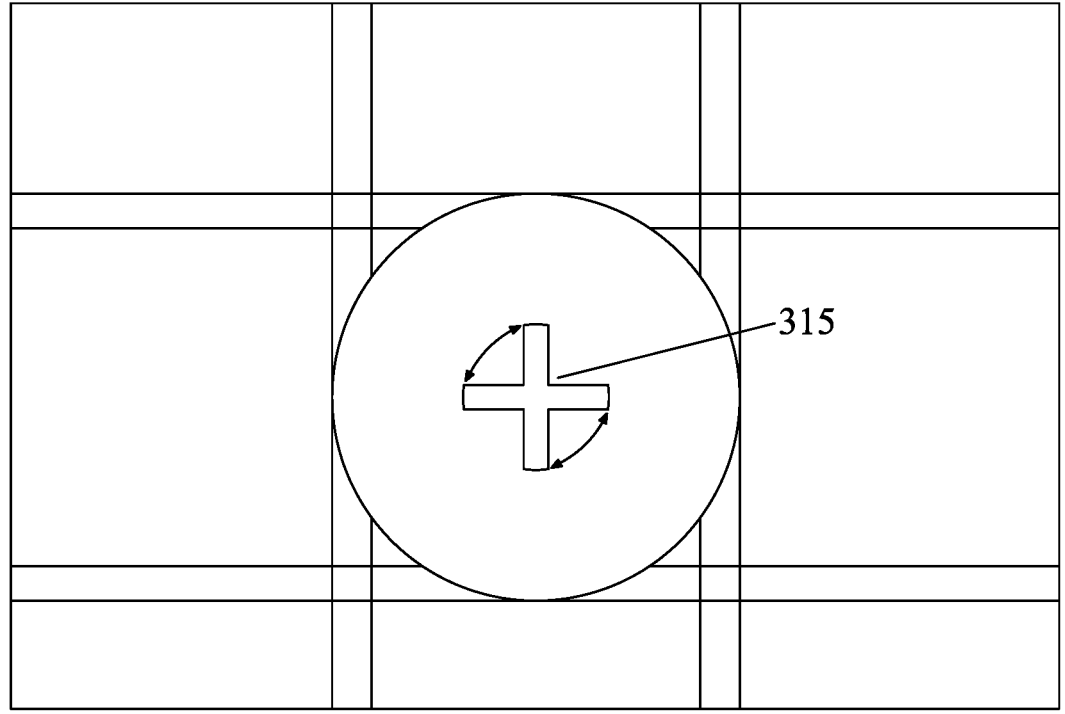
FIG. 20 shows a top view of a movement system with floor brackets that correspond with the interior turntable.

FIG. 20 shows a top view of a movement system with floor brackets that correspond with the interior turntable. At least one rail bracket 315 may be built into the movement system 300 that includes delivery tracks, rails and/or sensors system. The rail bracket 315 can rotate 360 degrees in any direction. The turntables 191 on the bottom of the delivery housings as shown in FIG. 19B may allow the delivery housings and rail brackets to interact without the extra steps of the delivery housing moving onto the turntable, rotating direction, then moving from the turntable.

Figure 21:
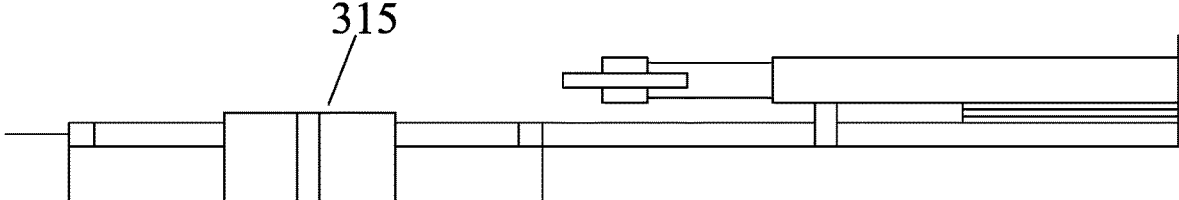
FIG. 21 shows a cross-sectional side view of a delivery housing with an attached interior turntable on a movement system with a rail bracket.

FIG. 21 shows a cross sectional side view of a delivery housing with an attached interior turntable on a movement system with a rail bracket. A rail bracket 315 may be built into the delivery tracks, rails and/or sensors system. The rail bracket 315 can rotate 360 degrees in any direction. The turntable 191 on the bottom of the delivery housings may allow the delivery housings and floor brackets to interact without the extra steps of moving onto the turntable, rotating direction, then moving from the turntable. The base of the turntable can extend into the delivery tracks, rails and/or sensor floor brackets to provide stabilization as the top of the turntable can rotate 360 degrees in any direction. The delivery housing is connected to the track, sensors and/or rails with casters, wheels and/or sensors.

What is claimed is:

1. An automated management system for managing storage, parking, and delivery of a recreational vehicle comprising:
a block unit for receiving a recreational vehicle;
a delivery system connected to the block unit for transporting the recreational vehicle to and from the block unit comprising:
a plurality of delivery housings that are differently sized to accommodate differently sized recreational vehicles, wherein each of the plurality of delivery housings is configured for receiving the recreational vehicle and transporting the recreational vehicle to and from the block unit,
a first turntable configured to connect with at least one of the plurality of delivery housings for delivering the recreational vehicle to the at least one of the plurality of delivery housings or receiving the recreational vehicle from the at least one of the plurality of delivery housings, and
a second turntable as a separate component from the plurality of delivery housings;
a movement system for moving the at least one of the plurality of delivery housings and the first turntable;
and wherein each of the plurality of delivery housings comprises a main frame and an adjustable portion connected to the main frame, each of the plurality of delivery housings having an adjustable dimension by automatically adjusting the adjustable portion relative to the main frame to accommodate the vehicle based on size, the adjustable portion comprising an extension to increase or decrease the adjustable dimension.

2. The automated management system according to claim 1, wherein each of the plurality of delivery housings further comprises a plurality of adjustable portions, each of the plurality of delivery housings having a plurality of adjustable dimensions by adjusting the plurality of adjustable portions relative to the main frame; wherein a first adjustable dimension of the plurality of adjustable dimensions is an adjustable length to accommodate the recreational vehicle based on length; wherein a first adjustable portion of the plurality of adjustable portions is a length extension to increase or decrease the adjustable length; wherein a second adjustable dimension of the plurality of adjustable dimensions is an adjustable width to accommodate the recreational vehicle based on width; and wherein a second adjustable portion of the plurality of adjustable portions is a width extension to increase or decrease the adjustable width.

3. The automated management system according to claim 1, wherein the adjustable dimension of each of the plurality of delivery housings is an adjustable length to accommodate the recreational vehicle based on length, and the adjustable portion further comprises a length extension to increase or decrease the adjustable length.

4. The automated management system according to claim 3, further comprising a recreational vehicle sensor to trigger the length extension.

5. The automated management system according to claim 1, wherein the adjustable dimension of each of the plurality of delivery housings is an adjustable width to accommodate the recreational vehicle based on width, and the adjustable portion further comprises a width extension to increase or decrease the adjustable width.

6. The automated management system according to claim 5, further comprising a recreational vehicle sensor to trigger the width extension.

7. The automated management system according to claim 1, wherein the adjustable dimension of each of the plurality of the delivery housings is an adjustable height to accommodate a gooseneck or $5^{th}$ wheel hitch of a recreational travel trailer based on height, and the adjustable portion further comprises a height extension to increase or decrease the adjustable height.

8. The automated management system according to claim 1, further comprising four different sized trailer balls configured to rotate at a front of each of the plurality of delivery housings.

9. The automated management system according to claim 1, wherein each of the plurality of delivery housings further comprises a sensor for guiding movement of each of the delivery housings via the movement system.

10. An automated management system for managing storage, parking, and delivery of a recreational vehicle comprising:

a block unit for receiving a recreational vehicle;

a delivery system connected to the block unit for transporting the recreational vehicle to and from the block unit comprising:

a plurality of delivery housings that are differently sized to accommodate differently sized recreational vehicles, wherein each of the plurality of delivery housings is configured for receiving the recreational vehicle and transporting the recreational vehicle to and from the block unit, a first turntable configured to connect with at least one of the plurality of delivery housings for delivering the recreational vehicle to the at least one of the plurality of delivery housings or receiving the recreational vehicle from the at least one of the plurality of delivery housings, and a second turntable attached to an underside of each of the plurality of delivery housings;

a movement system for moving the at least one of the plurality of delivery housings and the first turntable; and wherein each of the plurality of delivery housings comprises a main frame and an adjustable portion connected to the main frame, each of the plurality of delivery housings having an adjustable dimension by automatically adjusting the adjustable portion relative to the main frame to accommodate the vehicle based on size, the adjustable portion comprising an extension to increase or decrease the adjustable dimension.

11. A method of operating a management system for managing storage, parking, and delivery of a recreational vehicle, wherein the management system comprises a block unit for receiving the recreational vehicle; a delivery system connected to the block unit for transporting the recreational vehicle to and from the block unit comprising: a plurality of delivery housings that are differently sized to accommodate differently sized recreation vehicles, each of the plurality of delivery housings configured for receiving the recreational vehicle and transporting the recreational vehicle to and from the block unit, a first turntable configured to connect with each of the plurality of delivery housings for delivering the recreational vehicle to a selected delivery housing of the plurality of delivery housings or receiving the recreational vehicle from the selected delivery housing of the plurality of delivery housings; a movement system for moving the selected delivery housing of the plurality of delivery housings and the first turntable; wherein each of the plurality of delivery housings comprises a main frame and an adjustable portion connected to the main frame, each of the plurality of delivery housings having an adjustable dimension by adjusting the adjustable portion relative to the main frame to accommodate the recreational vehicle based on size, the adjustable portion comprising an extension to increase or decrease the adjustable dimension, the method comprising:

moving the selected delivery housing of the plurality of delivery housings via the movement system; and aligning the selected delivery housing of the plurality of delivery housings into a position that is collinear with the first turntable when the recreational vehicle is positioned on the first turntable via the movement system.

12. The method according to claim 11, wherein the selected delivery housing of the plurality of delivery housings contains the recreational vehicle, and further comprising moving the selected delivery housing of the plurality of delivery housings containing the recreational vehicle via the movement system.

13. The method according to claim 11, wherein the block unit further comprises a securing mechanism to secure the recreational vehicle within the block unit.

14. The method according to claim 11, further comprising receiving the recreational vehicle on the first turntable, moving the first turntable into the selected delivery housing of the plurality of delivery housings, and positioning and releasing the recreational vehicle from the first turntable into the selected delivery housing of the plurality of delivery housings, wherein the first turntable is moved into the selected delivery housing of delivery housing via the movement system.

15. The method according to claim 11, wherein the management system further comprises a second turntable, and the method further comprising receiving the recreational vehicle by the selected delivery housing of the plurality of delivery housings, moving the second turntable to position the selected delivery housing of the plurality of delivery housings, and moving the selected delivery housing of the plurality of delivery housings into the block unit, wherein the selected delivery housing of the plurality of delivery housings is moved via the movement system.

16. The method according to claim 15, wherein the block unit further comprises a release sensor, and the method further comprising, when the selected delivery housing of the plurality of delivery housings containing the recreational vehicle enters the block unit, contacting the release sensor to trigger release of the recreational vehicle from the selected delivery housing of the plurality of delivery housings into the block unit.

17. The method according to claim 11, further comprising sensing a dimension of the recreational vehicle on the first turntable by a recreational vehicle sensor, wherein the recreational vehicle sensor triggers the extension of the adjustable portion to increase or decrease the adjustable dimension.

\* \* \* \* \*